United States Patent [19]
Aritake et al.

[11] Patent Number: 5,696,552
[45] Date of Patent: Dec. 9, 1997

[54] STEREOSCOPIC DISPLAY APPARATUS

[75] Inventors: Hirokazu Aritake; Masayuki Kato; Manabu Ishimoto; Noriko Sato; Masato Nakashima, all of Kawasaki, Japan

[73] Assignee: Fujitsu Limited, Kawasaki, Japan

[21] Appl. No.: 594,021

[22] Filed: Jan. 30, 1996

Related U.S. Application Data

[62] Division of Ser. No. 125,660, Sep. 23, 1993, Pat. No. 5,497,189.

[30] Foreign Application Priority Data

Sep. 30, 1992 [JP] Japan ............................ 260924

[51] Int. Cl.$^6$ ............... H04N 13/04; H04N 15/00
[52] U.S. Cl. ............... 348/51; 348/40; 348/41; 348/56
[58] Field of Search ............... 348/51, 52, 53, 348/54, 55, 56, 57, 58, 59, 60, 40, 41; H06N 13/04, 15/00

[56] References Cited

U.S. PATENT DOCUMENTS 4,964,684  10/1990  Iovine ........................ 359/23
5,036,385   7/1991  Eichenlaub .................. 348/55
5,315,377   5/1994  Isono ........................ 358/54

FOREIGN PATENT DOCUMENTS 1572606     2/1970  Germany.
1384963     2/1975  United Kingdom.
WO88/01761  3/1988  WIPO.

*Primary Examiner*—Howard W. Britton
*Attorney, Agent, or Firm*—Staas & Halsey

[57] ABSTRACT

An image display to display a 2-dimensional image and a beam deflector to deflect the lights from the pixels constructing the image of the image display are provided. The beam deflector is arranged closely in front of the image display. A plurality of 2-dimensional images of different visual directions are sequentially displayed in the image display. The light from each pixel is deflected by the beam deflector synchronously with the display of the 2-dimensional image so that the light from each pixel is directed to the region in which the visual point has been set in order to obtain each image. The switching operation in this instance is executed at a high speed.

40 Claims, 42 Drawing Sheets

FIG.16

| CORRESPONDING PIXEL | PHASE DISTRIBUTION DATA |
|---|---|
| $P_{11}$ | $\phi_{11,11}$  $\phi_{11,12}$ ------ $\phi_{11,mn}$ |
| $P_{ij}$ | $\phi_{ij,11}$  $\phi_{ij,12}$ ------ $\phi_{ij,mn}$ |
| $P_{MN}$ | $\phi_{MN,11}$  $\phi_{MN,12}$ ------ $\phi_{MN,mn}$ |

$\phi_{ij,kl}$
CORRESPONDING ⌐     ⌐ VIRTUAL OPENING
PIXEL                        AREA

FIG.17

| VIRTUAL OPENING AREA | 2-DIMENSIONAL IMAGE DATA |
|---|---|
| $S_{11}$ | $G_{11}$ |
| $S_{kl}$ | $G_{kl}$ |
| $S_{mn}$ | $G_{mn}$ |

FIG.20

| CORRESPONDING PIXEL | PHASE DISTRIBUTION DATA | | | |
|---|---|---|---|---|
| $P_{11}$ | $\phi_{11,1}$ | $\phi_{11,2}$ | ------ | $\phi_{11,n}$ |
| $\vdots$ | | | $\vdots$ | |
| $P_{ij}$ | $\phi_{ij,1}$ | $\phi_{ij,2}$ | ------ | $\phi_{ij,n}$ |
| $\vdots$ | | | $\vdots$ | |
| $P_{MN}$ | $\phi_{MN,1}$ | $\phi_{MN,2}$ | ------ | $\phi_{MN,n}$ |

$$\phi_{ij,l}$$
CORRESPONDING ⤴  ⤴ VIRTUAL OPENING
PIXEL                    AREA

FIG.21

| VIRTUAL OPENING AREA | 2-DIMENSIONAL IMAGE DATA |
|---|---|
| $S_1$ | $G_1$ |
| $\vdots$ | $\vdots$ |
| $S_l$ | $G_l$ |
| $\vdots$ | $\vdots$ |
| $S_n$ | $G_n$ |

FIG. 24

| CORRESPONDING PIXEL | PHASE DISTRIBUTION DATA | | |
|---|---|---|---|
| $P_1$ | $\Phi_{1,1}$ | $\Phi_{1,2}$ ------ | $\Phi_{1,n}$ |
| $P_j$ | $\Phi_{j,1}$ | $\Phi_{j,2}$ ------ | $\Phi_{j,n}$ |
| $P_N$ | $\Phi_{N,1}$ | $\Phi_{N,2}$ ------ | $\Phi_{N,n}$ |

$\Phi_{j,\ell}$

CORRESPONDING PIXEL ⎯⎦  ⎣⎯ VIRTUAL OPENING AREA

FIG.34

| VIRTUAL OPENING AREA | 2-DIMENSIONAL |
|---|---|
| A1 | $DG_{11}$<br>$DG_{12}$<br>$\vdots$<br>$DG_{1n}$ |
| A2 | $DG_{21}$<br>$DG_{22}$<br>$\vdots$<br>$DG_{2n}$ |
| An | $DG_{m1}$<br>$DG_{m2}$<br>$\vdots$<br>$DG_{mn}$ |

$t = t_1$ $t = t_2$

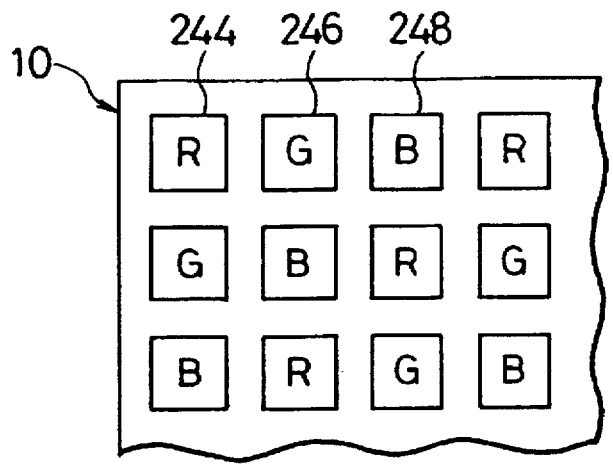
FIG.62A
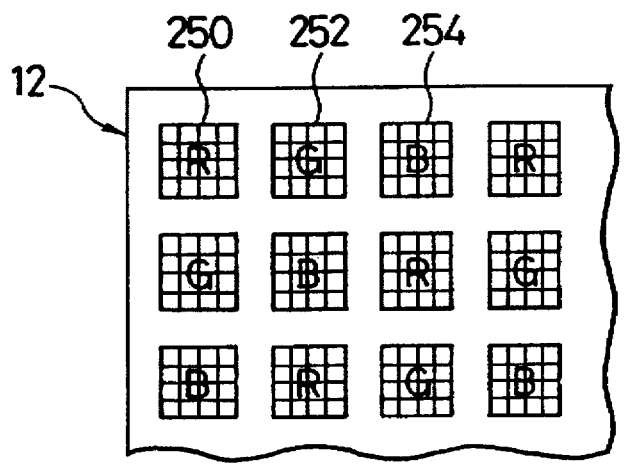
FIG.62B
FIG.63
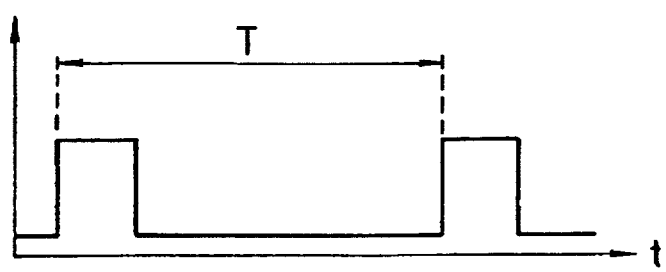

STEREOSCOPIC DISPLAY APPARATUS

This application is a division of application Ser. No. 08/125,660, filed Sep. 23, 1993, now U.S. Pat. No. 5,487,189, issued Mar. 5, 1996.

BACKGROUND OF THE INVENTION

The invention relates to a stereoscopic display apparatus for displaying a solid image from a plurality of 2-dimensional images at different visual point positions and, more particularly, to a stereoscopic display apparatus for performing a stereoscopic display which has been known as an image type holographic stereogram.

Hitherto, various kinds of studies and developments have been executed with respect to a display method which can stereoscopically observe an image. The conventional stereoscopic display method relates to the double-eye type represented by a glasses type and is a system in which different images are seen to the right and left eyes and a stereoscopic feeling is obtained by a vergence of both eyes or a parallax of both eyes. There is a Lenticular method of the multieye type as an extension of the double-eye type. The principle of stereoscopic observation is similar to that of the double-eye type. According to such a conventional stereoscopic display method, even when the observer moves the head to the right and left, no difference (kinetic parallax) occurs between the solid images which are observed, so that only an unnatural solid image can be seen. A holographic stereogram can be mentioned as means for eliminating such problems. In the holographic stereogram, a 2-dimensional video image including a parallax is recorded on slit-like segment holograms which are elongated in the vertical direction and a number of such segment holograms are arranged in the horizontal direction. Therefore, even when the observer moves the head to the right and left, a natural stereoscopic feeling can be obtained. There is also a holographic stereogram including a parallax in the vertical direction. For example, when considering a holographic stereogram having a horizontal parallax, first, as shown in FIG. 1, objects 332 and 334 are photographed while changing the camera position from a position 330-1 to a position 330-n. As shown in FIG. 2, a laser beam 342 is subsequently irradiated to a film 336 obtained by the photographing in FIG. 1. A transmission light which passed through the film 336 is projected onto a diffusing plate 340 through a lens 338, thereby generating an object light 344. A slit 350 of a slit plate 348 is located in front of a hologram dryplate 352 in correspondence to the photographing position. An interference fringe (phase distribution) is obtained by an interference between a reference light 354 and the object light 344 and is exposed and recorded onto the hologram dry plate 352.

Further, as shown in FIG. 3, there is also a method of forming a hologram which was imaged. That is, a laser beam (reproduction light) is irradiated onto the hologram dryplate 352 formed in FIG. 2 so as to be converged by a reproduction light source 355 which is shown as a virtual image. Another hologram dryplate is provided at the display position of the image due to the object light 344 which was wave front converted by the exposed hologram dry plate 352. The hologram dry plate is exposed by irradiating the reference light 362 thereto, thereby forming an imaged holographic stereogram (hereinafter, referred to as an "image type holographic stereogram") 360. As shown in FIG. 4, a reproduction light 364 is irradiated to the image type holographic stereogram 360, the reproduction light is converted into the wave front, so that a solid image to be seen from a visual field region 366.

In case of performing a stereoscopic display, it is desirable that a solid image exists near the hologram surface in order to reduce a fatigue of the eyes of the observer. In the holographic stereogram of FIG. 1, it is necessary to convert the image photographed by the camera in order to reconstruct so as to overlap a solid image onto the hologram surface. On the other hand, in an image type holographic stereogram of FIG. 4, since a 2-dimensional image exists on the hologram surface, the solid image can be overlapped onto the hologram surface without converting the image. There is also an advantage such that even when a wavelength of reference light which is irradiated to the hologramchanges, the image plane exists on the hologram surface and no color aberration occurs and the like. Therefore, it can be said that a solid image can be more easily seen in case of the stereoscopic display by the image type holographic stereogram.

Such a hologram, on the other hand, can be electronically displayed by using, for example, a space light modulating device using a liquid crystal. To electronically display a hologram by using the space light modulating device, however, it is generally necessary to obtain a phase distribution of the light from a 3-dimensional object to be displayed by a calculation by a computer. With respect to the image type holographic stereogram, it is necessary to calculate a phase distribution from a 2-dimensional image. To calculate the phase distribution, the hologram surface is divided into micro hologram regions. A phase distribution is calculated from the position coordinates and luminance of all of the sampling points of the object with regard to one microregion. Such a calculation is executed with respect to all of the micro hologram regions. Consequently, a calculation amount is extremely large even in case of the image type holographic stereogram to perform the phase calculations for the 2-dimensional image as a target. Each time the content of the 2-dimensional image to be displayed changes, it is necessary to calculate the phase distribution. A load of the calculations by the computer is large. It is demanded to improve such a point.

SUMMARY OF THE INVENTION

According to the invention, there is provided a stereoscopic display apparatus which can perform a stereoscopic display without needing to calculate the phase distribution even when a 2-dimensional image changes with respect to an image type holographic stereogram as a target. The invention intends to provide a stereoscopic display apparatus for displaying a solid image from a plurality of 2-dimensional images of different visual directions, namely, a stereoscopic display apparatus for displaying a solid image by an image holographic stereogram. The stereoscopic display apparatus comprises: an image display section to display a plurality of 2-dimensional images of different visual directions; and a beam deflecting section to deflect the light from pixels constructing the images displayed by the image display section. Specifically speaking, the beam deflecting section is arranged closely in front of the image display section. A plurality of 2-dimensional images of different visual directions are sequentially displayed in the image display section. At the same time, the light from each pixel is deflected by the beam deflecting section synchronously with the display of the 2-dimensional images in a manner such that the light from each pixel is directed toward an area in which a visual point has been set to obtain each image. A switching operation in this instance is executed at a high speed. Consequently, at an arbitrary position in a region (hereinafter, referred to as a "visible region" or "visible range") in which a solid image can be seen, the right and left eyes of the observer see the 2-dimensional images having a parallax when they are seen from different visual points at which the right and left eyes are located, so that the observer can see a solid image.

A space light modulating device such as a liquid crystal device or the like is used as a beam deflecting section. A phase distribution to decide the deflecting direction is previously calculated for each of images of different visual directions and is fixedly prepared as a table data. In the case where the image was switched in the stereoscopic display, the phase distribution of the table data corresponding to the image is read out and the space light modulating device is driven. Therefore, there is no need to calculate the phase distribution each time the image is switched.

According to such a stereoscopic display apparatus of the invention, in the stereoscopic display of the image type holographic stereogram, a plurality of 2-dimensional images of different visual directions and the phase distribution information to deflect the pixels of each image into the region (virtual opening) set upon formation of the image are prepared, so that a solid image can be stereoscopically displayed by using a plurality of 2-dimensional images of different visual directions. There is, consequently, no need to calculate the phase distribution of each image and to display in the space light modulating device, and the calculation load can be remarkably reduced.

The above and other objects, features, and advantages of the present invention will become more apparent from the following detailed description with reference to the drawings.

BRIEF DESCRIPTION OF THE DRAWINGS

FIG. 16 is an explanatory diagram of a phase distribution storing table in the case where a 2-dimensional image has parallaxes in the horizontal and vertical directions;

FIG. 17 is an explanatory diagram of a 2-dimensional image storing table in the case where a 2-dimensional image has parallaxes in the horizontal and vertical directions;

FIG. 20 is an explanatory diagram of a phase distribution storing table in the case where a 2-dimensional image has a parallax in the horizontal direction;

FIG. 21 is an explanatory diagram of a 2-dimensional image storing table in the case where a 2-dimensional image has a parallax in the horizontal direction;

FIG. 24 is an explanatory diagram of a phase distribution storing table in case of the image division;

FIG. 34 is an explanatory diagram of a 2-dimensional image storing table which is used in the image display of FIG. 33;

FIGS. 62A and 62B are explanatory diagrams showing an arrangement of display color filters in FIG. 61 and an arrangement of phase distributions for RGB in the case where a 2-dimensional image has parallaxes in the horizontal and vertical directions;

FIG. 63 is a timing chart showing a driving signal of a display apparatus of FIG. 61.

DETAILED DESCRIPTION OF THE PREFERRED EMBODIMENTS (Fundamental construction and principle of the invention)

Figure 1:
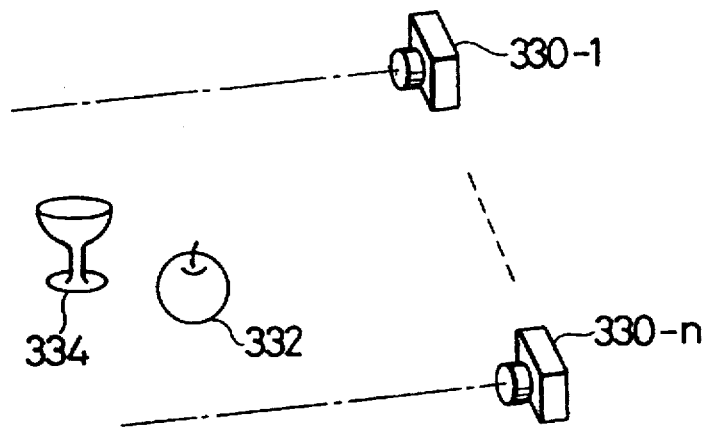
FIG. 1 is an explanatory diagram showing photographing positions of a target in the formation of a holographic stereogram.
Figure 2:
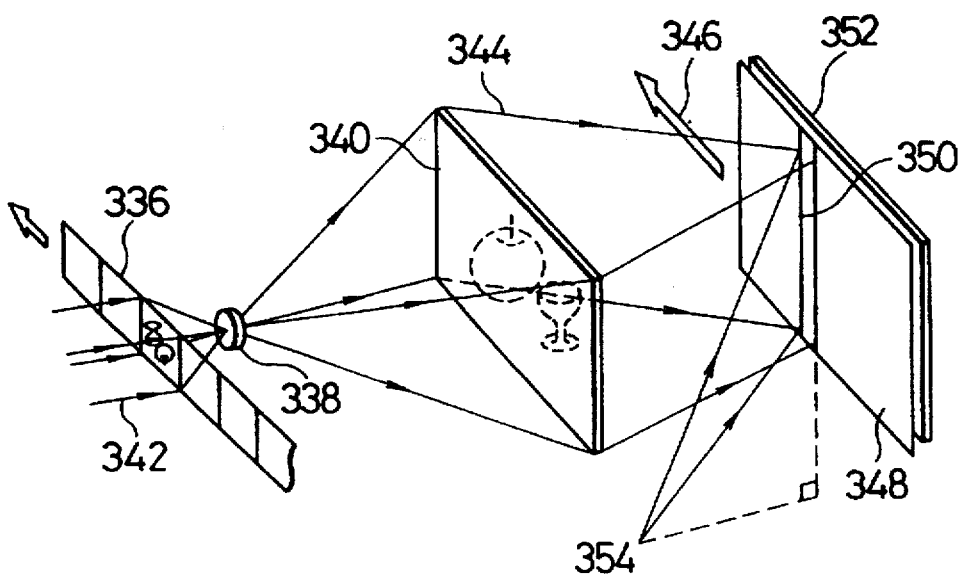
FIG. 2 is an explanatory diagram for forming a holographic stereogram by an interference exposure.
Figure 3:
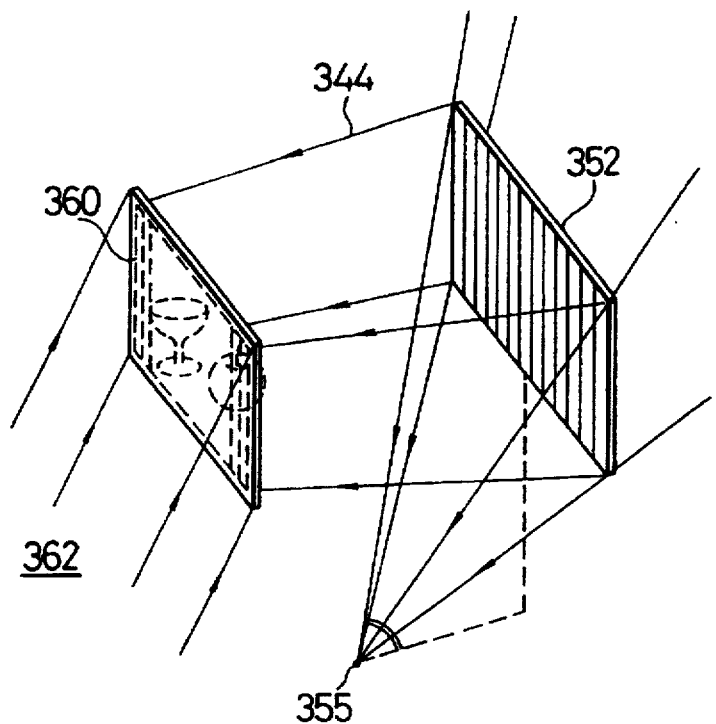
FIG. 3 is an explanatory diagram for forming an image type holographic stereogram by using a holographic stereogram.
Figure 4:
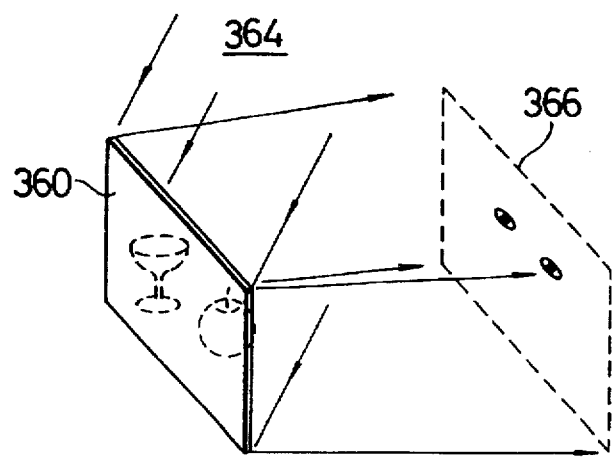
FIG. 4 is an explanatory diagram showing the reconstruction of an image type holographic stereogram.
Figure 5:
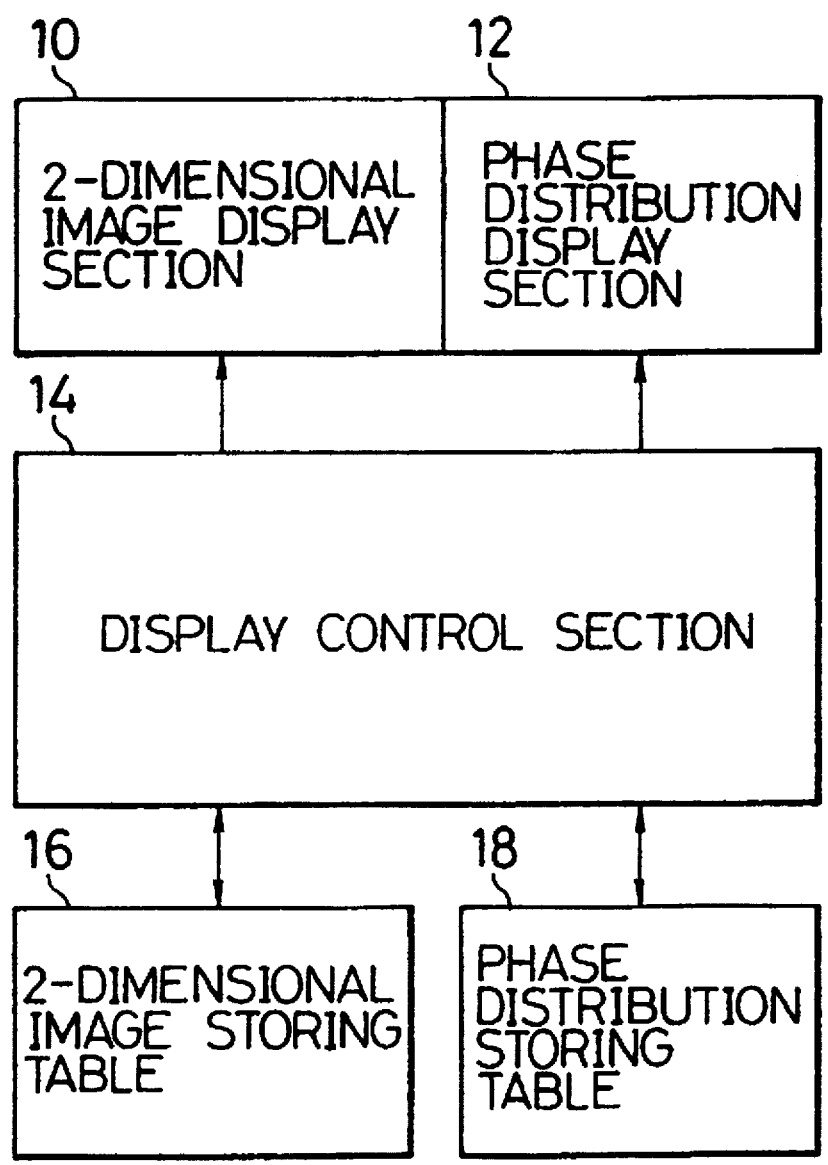
FIG. 5 is a constructional diagram of an embodiment showing a fundamental construction of the invention.

FIG. 5 shows a fundamental construction of the invention. A stereoscopic display apparatus of the invention comprises: a 2-dimensional image display section 10 as image display means; a phase distribution display section 12 as beam deflecting means; a display control section 14; a 2-dimensional image storing table 16; and a phase distribution storing table 18. For example, a liquid crystal display is used as a 2-dimensional image display section 10. A space light modulating device using a liquid crystal device or the like can be used as a phase distribution display section 12. The display control section 14 is realized by a computer. The 2-dimensional image storing table 16 and the phase distribution storing table 18 can be realized by memory devices. A plurality of 2-dimensional images which are used for stereoscopic display and which were seen from different visual point positions, what are called 2-dimensional images of different visual directions have previously been stored in the 2-dimensional image storing table 16, while using areas in which visual points have been set as instruction parameters. It is also possible to produce a plurality of 2-dimensional images of different visual directions by a CAD system or the like in a real-time manner and to supply them to the display control section 14 without storing into the 2-dimensional image storing table 16. Information of the phase distributions which had previously been calculated and are used to deflect the light from each pixel of the 2-dimensional image display section 12 toward a region (virtual opening) in which the visual point has been set has been stored in the phase distribution storing table 18 in order to produce the 2-dimensional image for each of the images of different visual directions. The display control section 14 sequentially reads out the 2-dimensional images of different directions from the 2-dimensional image storing table 16 and displays in the 2-dimensional image display section 10. The corresponding phase distribution is read out from the phase distribution storing table 18 synchronously with the display of the 2-dimensional image and displays in the phase distribution display section 12. Therefore, the light from each pixel of the 2-dimensional image displayed in the 2-dimensional image display section 10 is subjected to the deflection due to the phase distribution displayed in the corresponding phase distribution display section 12. The light from each pixel is deflected toward the region (virtual opening) in which the visual point position of each 2-dimensional image has been set, thereby allowing a 2-dimensional image of different parallaxes to be seen to the right and left eyes of the observer and enabling a solid image to be recognized.

Figure 6:
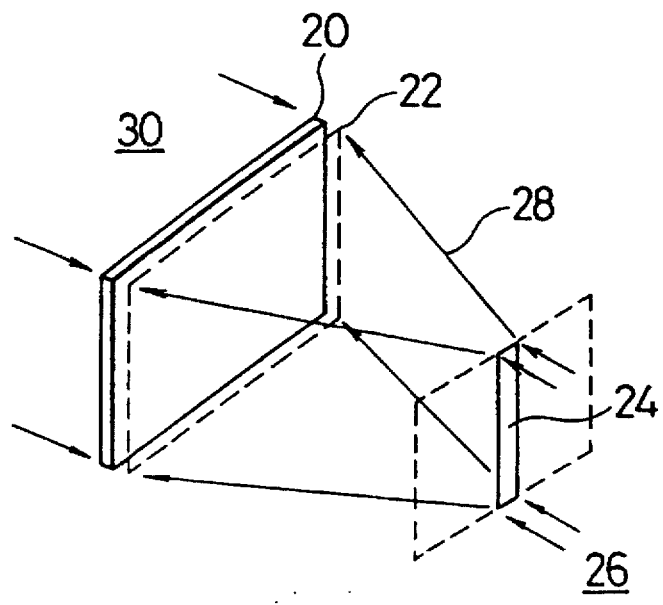
FIG. 6 is an explanatory diagram showing the formation of a holographic stereogram.
Figure 7:
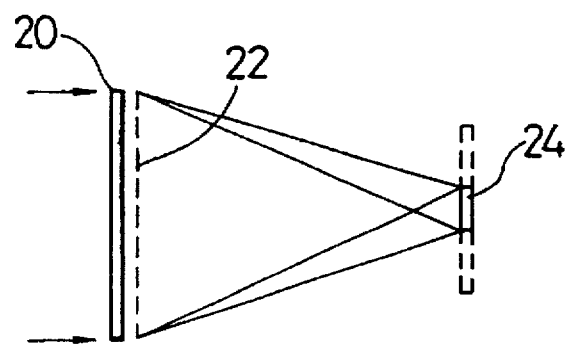
FIG. 7 is a plan view of FIG. 6.

The principle of the stereoscopic display of the invention will now be described. FIG. 6 shows an example of the formation of an image type holographic stereogram. FIG. 7 shows a plan view of FIG. 6. The position at which a diffusing plate 24 is disposed corresponds to the position at which an object was photographed by the camera. A 2-dimensional image 22 is an image which is obtained when the object is seen at the position of the diffusing plate 24. A size of diffusing plate 24 is equal to a size of virtual opening that is determined by the visual point setting area in the holographic stereogram. Each pixel of the 2-dimensional image 22 to be recorded onto the hologram 20 receives an object light 28 derived from the region of the diffusing plate 24 by the irradiation of a laser beam 26. The object light 28 which passed through each pixel of the 2-dimensional image 22 enters onto the hologram 20 and is interfered with a reference light 30 from the opposite side, so that the direction of each pixel of the 2-dimensional image is recorded as a form of an interference fringe. The recording of the interference fringe will now be described in detail with reference to FIG. 8.

Figure 8:
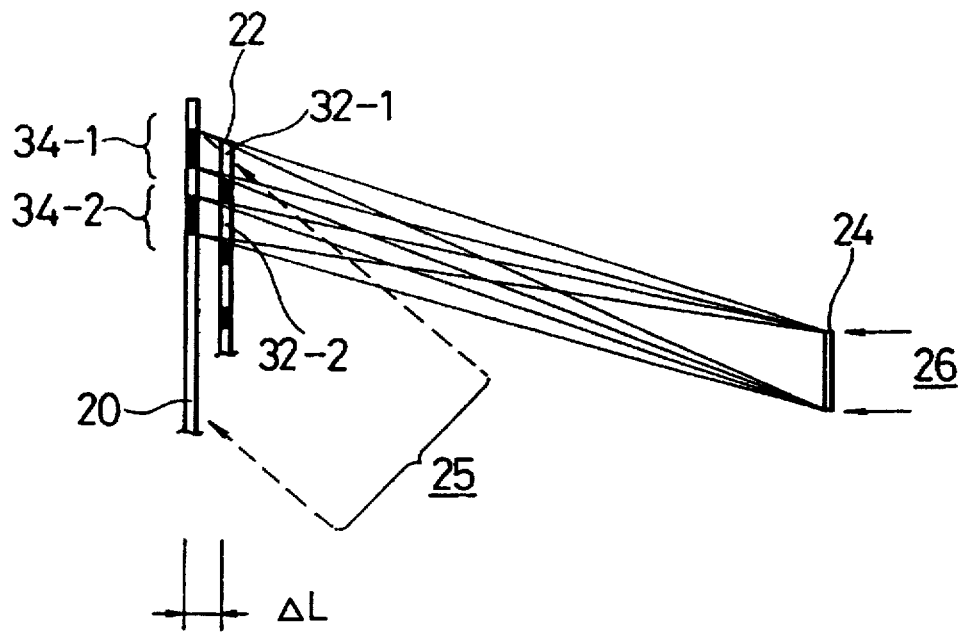
FIG. 8 is an explanatory diagram showing enlargedly the relation between the pixels of a 2-dimensional image in FIG. 6 and the interference fringe which is formed on a hologram.

In FIG. 8, it is now assumed that pixels 32-1 and 32-2 constructing the 2-dimensional image 22 change a transmission factor of the light and the pixel itself doesn't scatter. For simplicity of explanation, FIG. 8 shows the two pixels 32-1 and 32-2 as an example. In this instance, the light from the diffusing plate 24 is subjected to the modulation of the transmission factors which the pixels 32-1 and 32-2 have and enters the hologram 20. When the distance between the hologram 20 and the 2-dimensional image 22 is equal to a microdistance ΔL, interference fringes 34-1 and 34-2 which are recorded on the hologram 20 are separated every pixels 32-1 and 32-2. Intensities of the interference fringes 34-1 and 34-2 depend on the transmission factors of the pixels 32-1 and 32-2. Distributions of the interference fringes 34-1 and 34-2 relate to the positions of the diffusing plate 24 and the pixels 32-1 and 32-2.

In FIGS. 6 and 7, the reference light 30 has been inputted from the rear side of the hologram 20. In FIG. 8, however, the reference light 30 is inputted from the same surface as the 2-dimensional image 20. But, in case of obtaining the interference fringe, namely, phase distribution of the hologram 20 by the calculation, the direction of the reference light is not physically restricted.

Figure 9:
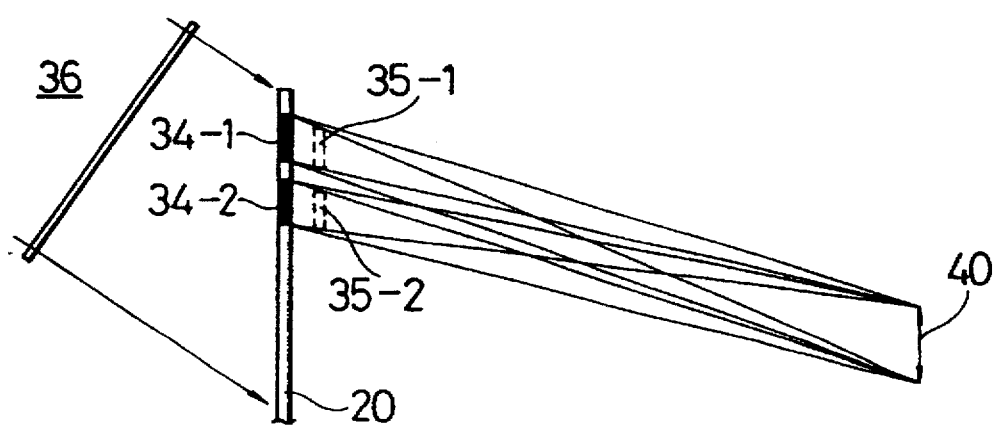
FIG. 9 is an explanatory diagram showing a reconstructing state of the holographic stereogram of FIG. 8.

FIG. 9 shows the reconstruction of a solid image by the hologram 20 formed by FIG. 8. The interference fringes 34-1 and 34-2 in which each pixel was recorded generates the lights of pixel openings 35-1 and 35-2. The lights are diffracted toward a visible range 40 in which the diffusing plate has been disposed. As for the diffraction light, since the extents of lights at the positions of the pixel openings 35-1 and 35-2 are minimum, a reproduction image is obtained at the display position of the 2-dimensional image. Since the intensities of the interference fringes 34-1 and 34-2 are proportional to the intensity of each pixel of the recorded 2-dimensional image, the whole image of the recorded 2-dimensional image can be seen at the position of the visible range 40 in which the diffusing plate 24 in FIG. 8 was disposed. In the display of the image holographic stereogram as mentioned above, since the distributions of the interference fringes 34-1 and 34-2 in which the pixel information has been recorded are mutually independent, the interference fringe distribution and the intensity of the individual interference fringe, namely, the transmission position information of the image can be separately handled.

Figure 10:
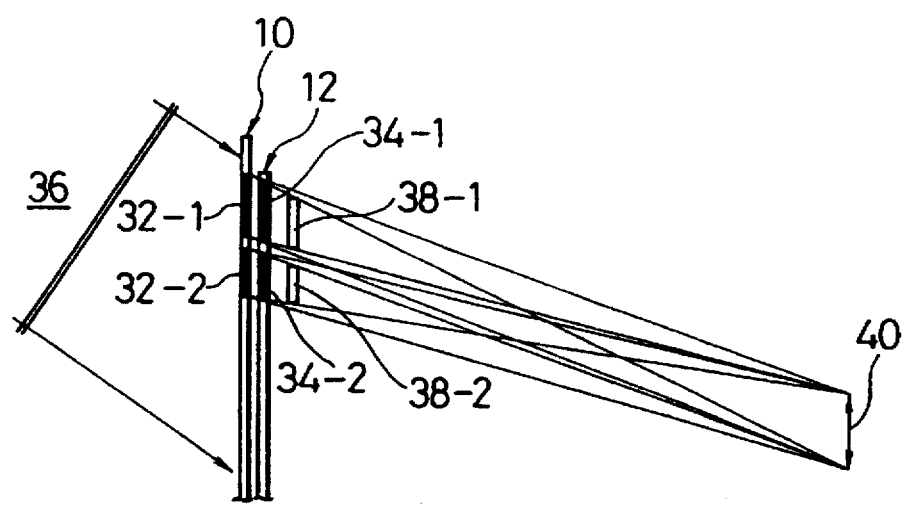
FIG. 10 is an explanatory diagram showing the reconstructing principle of the invention.

FIG. 10 shows the reconstructing principle of the stereoscopic display apparatus of the invention. The phase distribution display section 12 is disposed closely in front of the 2-dimensional image display section 10 of the transmission factor modulating type. As shown in FIG. 8, since the distribution of the interference fringes in the phase distribution display section 12 is determined by the positional relation between the pixels 32-1 and 32-2 and the diffusing plate 24, by once calculating and storing the interference fringes (phase distributions) 34-1 and 34-2 which are displayed in the phase distribution display section 12 and are used to deflect the light to the visible range 40 corresponding to the set position of the diffusing plate, there is no need to again calculate them. That is, the phase distributions which are displayed in the phase distribution display section 12 can be fixedly supplied into a read only memory or supplied as table data. The transmission factor of the image can be realized by changing the intensities of lights to reconstruct the interference fringes 34-1 and 34-2 of the display section 12. Therefore, the 2-dimensional image display section 10 is provided at a position near the phase distribution display section 12. The light intensity of a reproduction light 36 is changed by the transmission factors of the pixels 32-1 and 32-2 of the display image and the lights are inputted to the interference fringes 34-1 and 34-2 of the phase distribution display section 12.

Figure 11:
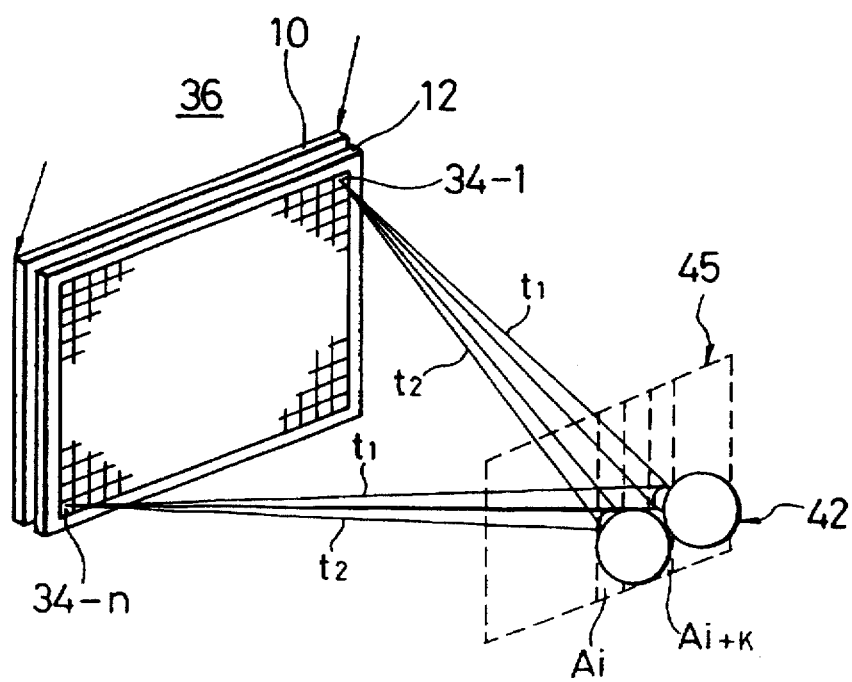
FIG. 11 is an explanatory diagram showing a fundamental construction of an apparatus of the invention and the principle of the stereoscopic display.

FIG. 11 is a perspective view of a stereoscopic display apparatus of the invention shown in FIG. 10. The phase distribution display section 12 is arranged at a position near the 2-dimensional image display section 10 and the reproduction light 36 is irradiated from the rear side of the display section 10. In the image type holographic stereogram, it is necessary to reconstruct 2-dimensional images in the case where they were seen from a plurality of different opening positions in the visible region. That is, as shown in FIG. 11, it is necessary to diffract the light toward a plurality of openings which are set in a visible region 45 from the same pixel position of the 2-dimensional image display section 10. For this purpose, the diffracting direction of the light which is emitted from the same pixel of the display section 10 is changed with the elapse of time, thereby enabling a solid image to be seen by an after image. For example, as shown in the interference fringes 34-1 and 34-2 in the phase distribution display section 12 in FIG. 10, the light is diffracted toward a virtual opening area $A_i$ at time $t_1$ and the light is diffracted toward a different virtual opening area $A_{i+k}$ at time t2.

Figure 12A:
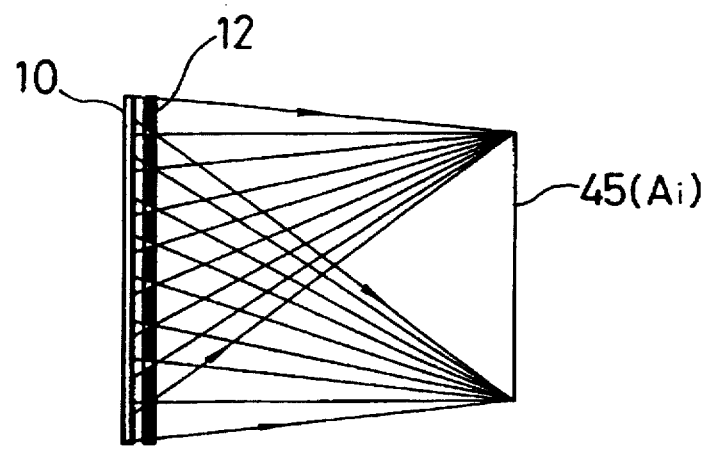
FIGS. 12A and 12B are explanatory diagrams showing the principle of the deflection by a phase distribution display of the invention in 2-dimensional images having a parallax in the horizontal direction.
Figure 12B:
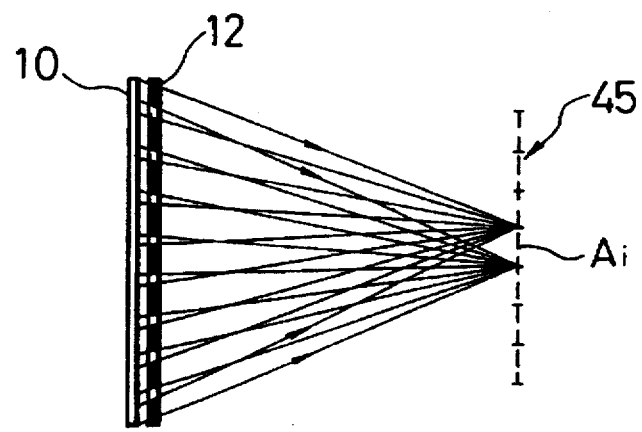

FIG. 12A is a side elevational view showing further in detail the light deflection by the phase distribution display section 12. FIG. 12B is a plan view of FIG. 12A. The visible region 45 is divided as a virtual opening in the horizontal direction, thereby obtaining stripe-shaped regions which are long in the vertical direction. A 2-dimensional image obtained by being observed from the central virtual opening area $A_i$ is displayed in the 2-dimensional image display section 10. In this instance, one interference fringe is deflected in the phase distribution display section 12 so as to be irradiated to the whole region in the height direction of the virtual opening $A_i$ with respect to the vertical direction of FIG. 12A. On the other hand, with regard to the horizontal direction when it is seen from the plan view shown in FIG. 12B, each interference fringe of the phase distribution display section 12 is deflected so as to be collected toward the central virtual opening area $A_i$ of the visible region 45. (Formation of phase distribution storing table)

The phase distribution (interference fringe) which gives a light deflection that is determined every image of a different visual direction has previously been stored as table data in the phase distribution storing table 18 shown in FIG. 5. The formation of the data which is stored into the phase distribution storing table 18 will now be described.

(I) Calculation of phase distribution

The principle of a hologram will be first explained. One laser beam is divided into two beams. One of the two laser beams is irradiated to an object, so that a laser beam (object light) is scattered by the object. A hologram is obtained by an interference of two light fluxes of the laser beam (object light) and another laser beam (reference light ). Now, assuming that a wave front Of the reference light is set to $R \cdot \exp(j\phi_r)$ and a wave front of the object light is set to $O \cdot \exp(j\phi_o)$, an exposing intensity $I_H$ of the hologram is $$I_H = R^2 + O^2 + 2 \cdot R \cdot O \cdot \cos(\phi_o - \phi_r) \quad (1)$$

In case of developing the hologram, changes in amplitude and phase which are proportional to the exposing intensity $I_H$ of the equation (1) occur in the hologram. To electrically form a hologram, it is sufficient to use a space light modulating device such as a liquid crystal device or the like which can change the amplitude and phase of the light. By inputting the same wave front as that of the reference light to the hologram formed as mentioned above, a hologram can be reconstructed. In the exposing intensity $I_H$ of the equation (1), since only the third term of the right side contributes to the reconstruction of the object light, when considering the third term of the right side, a transmission light T from the hologram is $$\begin{aligned} T &= I_H \cdot R \cdot \exp(j\phi_r) \\ &\propto 2 \cdot R \cdot O \cdot \cos(\phi_o - \phi_r) \cdot \exp(j\phi_r) \\ &= O \cdot \exp(j\phi_o) + O \cdot \exp\{-j(\phi_o - 2 \cdot \phi_r)\} \end{aligned} \quad (2)$$

The first term of the right side of the equation (2) indicates that the wave front from the object was reproduced. The second term of the right side denotes a conjugate wave of the object light. From the above description of the principle, it will be understood that it is sufficient to calculate only the third term of the right side of the equation (1) in the calculation of the phase distribution of the hologram.

Figure 13:
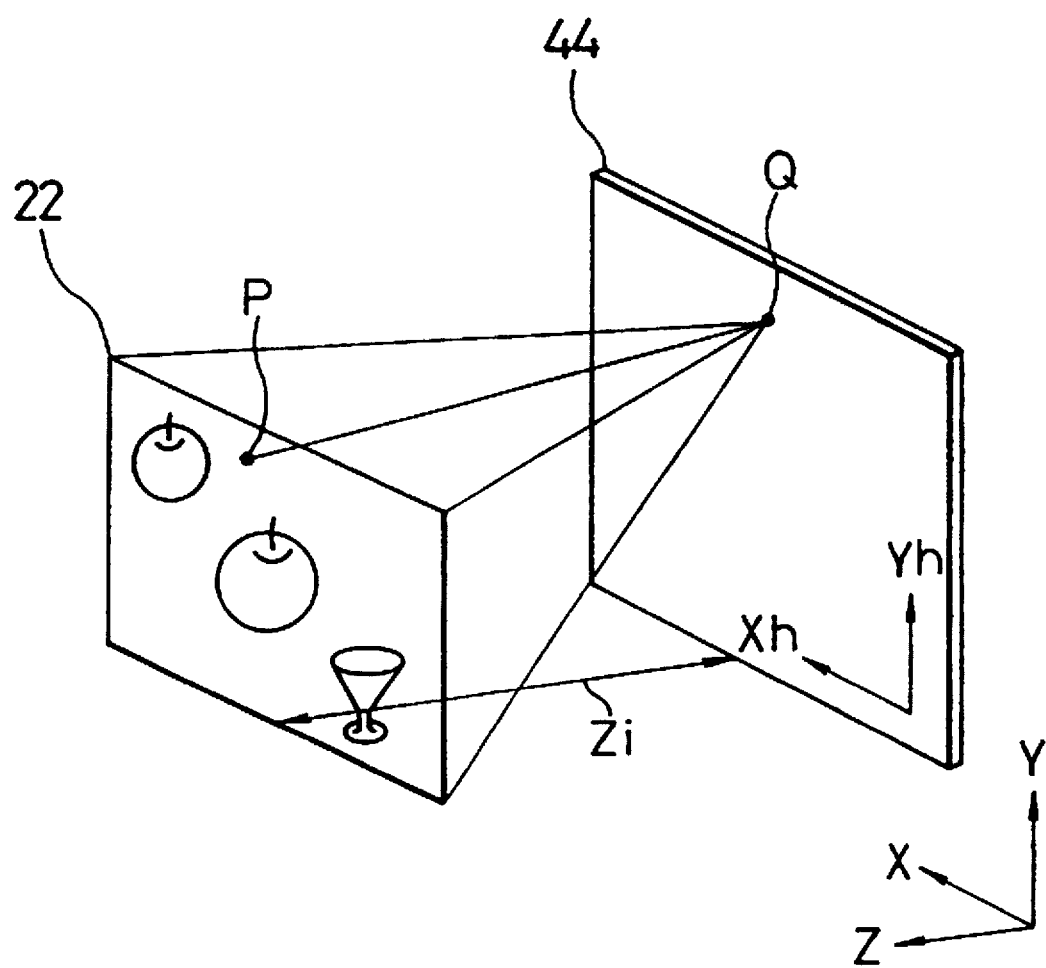
FIG. 13 is an explanatory diagram showing the calculation principle of a phase distribution with respect to a 2-dimensional image as a target.

FIG. 13 shows the principle of the calculation of the phase distribution in the holographic stereogram. In this case, when regarding that the reference light is constructed by a plane wave, since an intensity of the plane wave doesn't change in dependence on the location, a light intensity R can be ignored. It is possible to handle such that the phase $\phi_r = 0$. The coordinate value in the Z-axis direction of the 2-dimensional image 22 is equal to $Z_i$ and is constant. Now, assuming that a luminance (scattering degree) at a certain sampling point P having coordinates $(X_i, Y_i)$ in the 2-dimensional image 22 is set to $I_i$, the exposing intensity $I_H$ a point Q having the coordinates $(X_{hi}, Y_{hi})$ On a holographic stereogram 44 is $$I_H = \sum_i \{(I_i/r) \cdot \cos(k \cdot r)\} \quad (3)$$

where, k denotes the number of waves of the laser beam $$r = \sqrt{\{(X_i - X_{hi})^2 + (Y_i - Y_{hi})^2 + Z_i^2\}} \quad (4)$$

In case of FIG. 13, since the light from each pixel of the 2-dimensional image 22 reaches the whole hologram, it is necessary to execute the calculations (3) and (4) for the whole region of the holographic stereogram 44.

Figure 14:
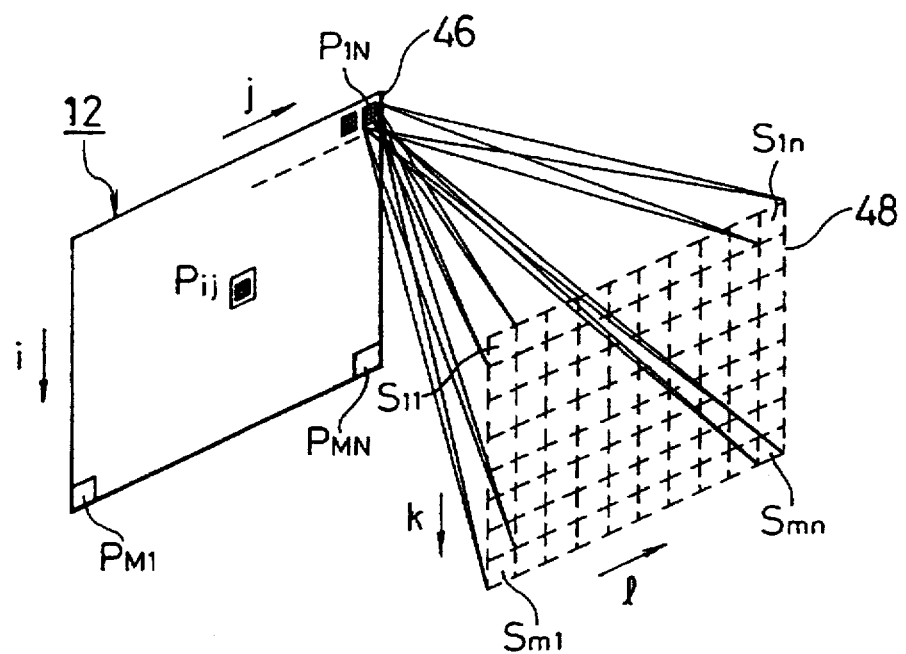
FIG. 14 is an explanatory diagram showing the deflecting function of a phase display section in the case where a 2-dimensional image has parallaxes in the horizontal and vertical directions.

(II) Phase calculation of image hologram having parallaxes in the horizontal and vertical directions FIG. 14 shows a deflecting function of the phase distribution display section 12 of the invention which is used to stereoscopically display a solid image having parallaxes in the horizontal and vertical directions. In the phase distribution display section 12, total (M×N) one-pixel phase display sections 46 each corresponding to one pixel of the 2-dimensional image are arranged, in which (M) phase display sections 46 are arranged in the vertical direction and (N) phase display sections 46 are arranged in the horizontal direction. When the horizontal direction is expressed by (j) and the vertical direction is expressed by (i), the pixel corresponding to an arbitrary one-pixel phase display section 46 is expressed by $P_{ij}$. A virtual opening 48 is arranged at the position serving as a visible region for the phase display section 12. Total (n×m) virtual openings 48 are arranged, in which (n) virtual openings 48 are arranged in the horizontal direction and (m) virtual openings 48 are arranged in the vertical direction. When the horizontal direction is expressed by (l) and the vertical direction is expressed by (k), an arbitrary virtual opening region is expressed by $S_{kl}$. An attention is now paid to a phase display section 46 of one pixel at the right upper corner of the phase distribution display section 12. A deflecting state of the display light from the corresponding pixel $P_{1n}$ is shown in FIG. 14. The light from the corresponding pixel $P_{1n}$ is deflected for regions $S_{11}$ to $S_{nm}$ of the virtual opening 48 as shown in the diagram.

Figure 15:
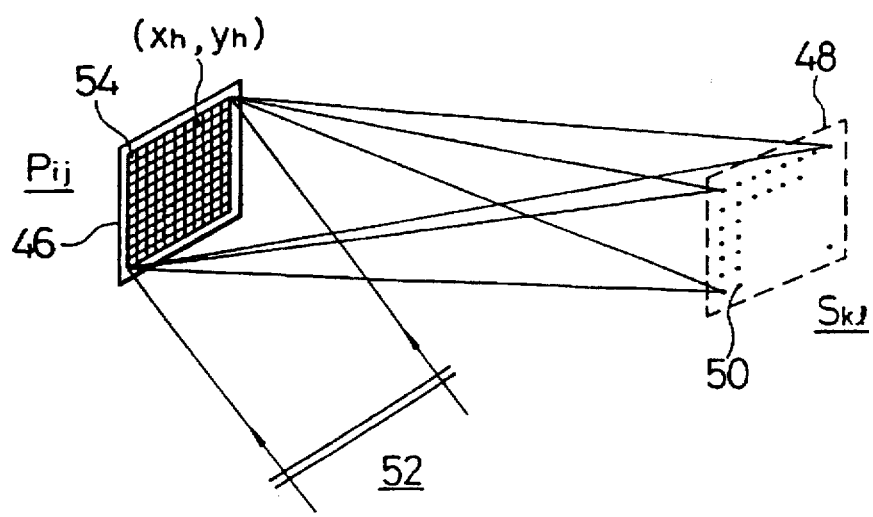
FIG. 15 is an explanatory diagram of a calculating method of a phase distribution to realize the deflecting function of FIG. 14.

FIG. 15 shows a calculating method of a phase distribution to realize the deflecting function shown in FIG. 14. A calculating method of a phase distribution in the one-pixel phase display section 46 of the corresponding pixel $P_{ij}$ is shown with respect to the relation with a region $S_{kl}$ of one virtual opening 48 as an example. First, a plurality of virtual point light sources 50 are arranged in the virtual opening 48 in the horizontal and vertical directions. A virtual reference light 52 is also set. In this state, a phase distribution is calculated by the equations (3) and (4) every pixel 54 for a phase display constructing the 1-pixel phase display section 46 with respect to all of the virtual point light sources 50. As 2-dimensional image data, as shown in FIG. 17, a plurality of 2-dimensional image data $G_{11}$ to $G_{mn}$ in the case where the virtual opening areas $S_{11}$ to $S_{mn}$ were seen as visual points are prepared and time-divisionally displayed. Therefore, the virtual openings 48 shown in FIG. 14 change in the horizontal and vertical directions with the elapse of time in association with the switching of the 2-dimensional image data $G_{11}$ to $G_{mn}$. The calculation of the phase distribution of FIG. 15 is executed with respect to each of the virtual opening regions whose positions change with the elapse of time in association with the 2-dimensional images $G_{11}$ to $G_{mn}$. With regard to an arbitrary corresponding pixel $P_{ij}$, accordingly, phase distributions $\Phi_{ij,11}$ to $\Phi_{ij,mn}$ are calculated so as to deflect the lights from the pixels into the virtual openings 48 of the different regions $S_{11}$ to $S_{mn}$ in correspondence to the 2-dimensional image displays by the time-division. Therefore, as shown in FIG. 16, the phase distribution data which is used by the time-divisional display is stored in the phase distribution storing table 18 of the invention every corresponding pixels $P_{11}$ to $P_{MN}$.

Figure 18:
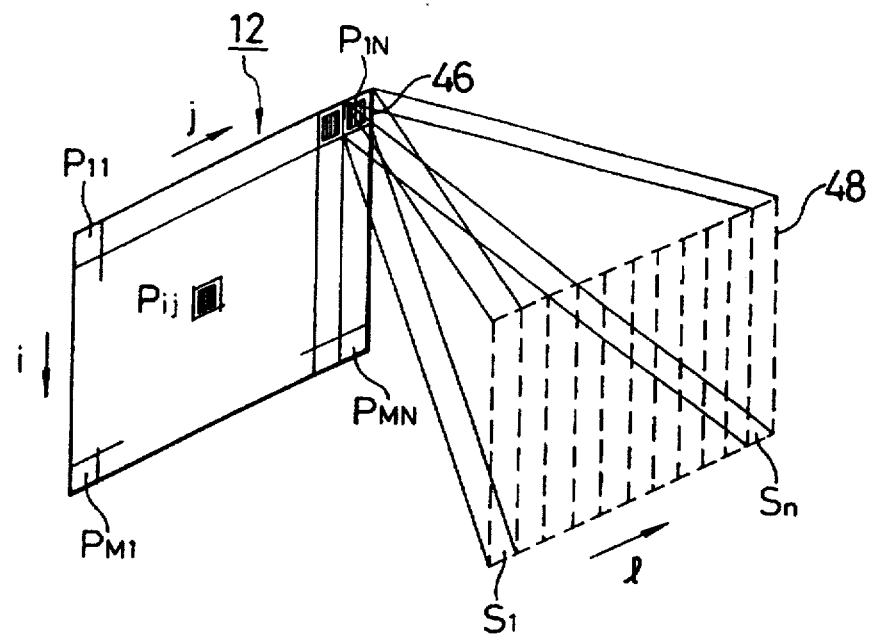
FIG. 18 is an explanatory diagram showing the deflecting function of a phase display section in the case where a 2-dimensional image has a parallax in the horizontal direction.

(III) Phase calculation of image hologram having a parallax in the horizontal direction FIG. 18 shows the deflecting function of the phase distribution display section 12 of the invention which is used for a stereoscopic display of an image having a parallax in the horizontal direction. Pixels which are long in the vertical direction are arranged in the phase display section 12. On the other hand, (n) virtual openings 48 are arranged in the horizontal direction as stripe regions which are long in the vertical direction. Now, assuming that the horizontal direction is expressed by l, an arbitrary virtual opening region is expressed by $S_l$. When an attention is paid to the 1-pixel phase display section 46 at the right upper corner of the phase display section 12, a deflecting state of the display light from the corresponding pixel $P_{1N}$ is shown and the light from the corresponding pixel $P_{1N}$ is deflected to the regions $S_1$ to $S_n$ of all of the virtual openings 48 as shown in the diagram.

Figure 19:
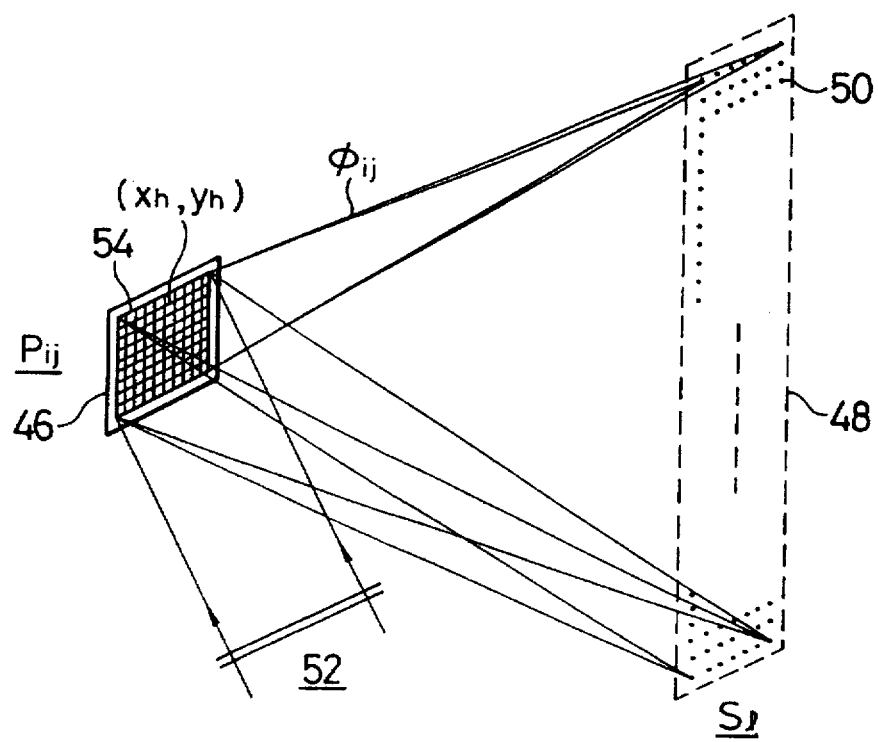
FIG. 19 is an explanatory diagram of a calculating method of a phase distribution to realize the deflecting function of FIG. 18.

FIG. 19 shows a calculating method of a phase distribution to realize the deflecting function shown in FIG. 18. A calculating method of a phase distribution in the 1-pixel phase display section 46 of the corresponding pixel $P_{ij}$ is shown with respect to the relation with the region $S_1$ of one virtual opening 48 as an example. Even in this case, a plurality of virtual point light sources 50 are arranged in the virtual opening 48 in the horizontal and vertical directions. The virtual reference light 52 is also set. In this state, phase distributions are calculated by the equations (3) and (4) every pixels 54 for phase display constructing the 1-pixel phase display section 46 with respect to all of the virtual point light sources 50. As 2-dimensional image data, as shown in FIG. 21, a plurality of 2-dimensional image data $G_1$ to $G_n$ in the case where the virtual opening regions $S_1$ to $S_n$ were seen as visual points are prepared and time-divisionally displayed. Therefore, the virtual opening 48 shown in FIG. 18 changes in the horizontal direction with the elapse of time in association with the switching of the 2-dimensional image data $G_1$ to $G_n$. Therefore, the calculation of the phase distribution in FIG. 19 is executed with respect to the virtual opening regions whose positions change with the elapse of time in association with the switching of the 2-dimensional images $G_1$ to $G_n$. With regard to an arbitrary corresponding pixel $P_{ij}$, accordingly, phase distributions $\Phi_{ij,1}$ to $\Phi_{ij,n}$ are calculated so as to deflect the lights from the pixels into the virtual openings 48 of the different regions $S_1$ to $S_n$ in correspondence to the 2-dimensional image display according to the time-division. Therefore, as shown in FIG. 20, the phase distribution data which is used by the time-divisional display is stored into the phase distribution storing table in case of an image having a parallax in the horizontal direction every corresponding pixels $P_{11}$ to $P_{MN}$.

(IV) Phase calculation of image hologram in case of dividing image

Figure 22:
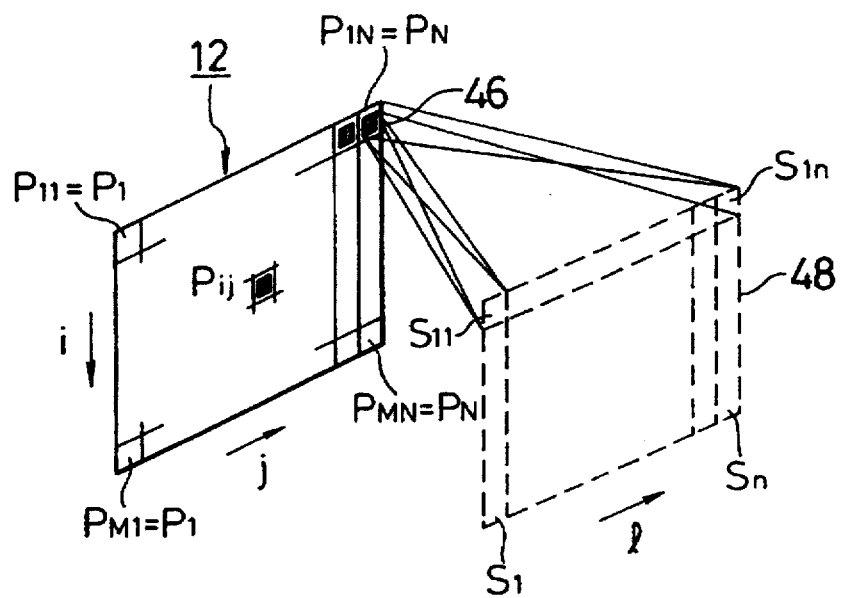
FIG. 22 is an explanatory diagram showing the deflecting function of the phase display section in case of the image division.

FIG. 22 shows the deflecting function of the phase distribution display section 12 of the invention for performing a stereoscopic display of an image having a parallax in the horizontal direction by using divided images. Pixels which are long in the vertical direction are arranged in the phase display section 12. On the other hand, (n) stripe regions which are long in the vertical direction are arranged in the virtual opening 48 in the horizontal direction. When the horizontal direction is now expressed by l, an arbitrary virtual opening region is expressed by $S_l$. The 2-dimensional image is now divided in the vertical direction into stripe images which are long in the horizontal direction. Therefore, when an attention is paid to the 1-pixel phase display section 46 at the right upper corner of the phase display section 12, the light from the corresponding pixel $P_{1N}$ is deflected to the regions $S_{11}$ to $S_{1n}$ of the top row of the virtual opening on the basis of the image division. Similarly, with respect to the second row of the phase display section 12, the light is also deflected to the regions of the second row the virtual opening 48. Thus, all of the 1-pixel phase display section 46 arranged in the vertical direction by the phase display section 12 are deflected in the same direction, they have the same phase distribution. Now, since the phase distributions of a plurality of 1-pixel display section 46 arranged in the vertical direction of the phase display section 12 can be handled as one phase distribution, the corresponding pixels are expressed by $P_1$ to $P_N$ in the vertical direction.

Figure 23:
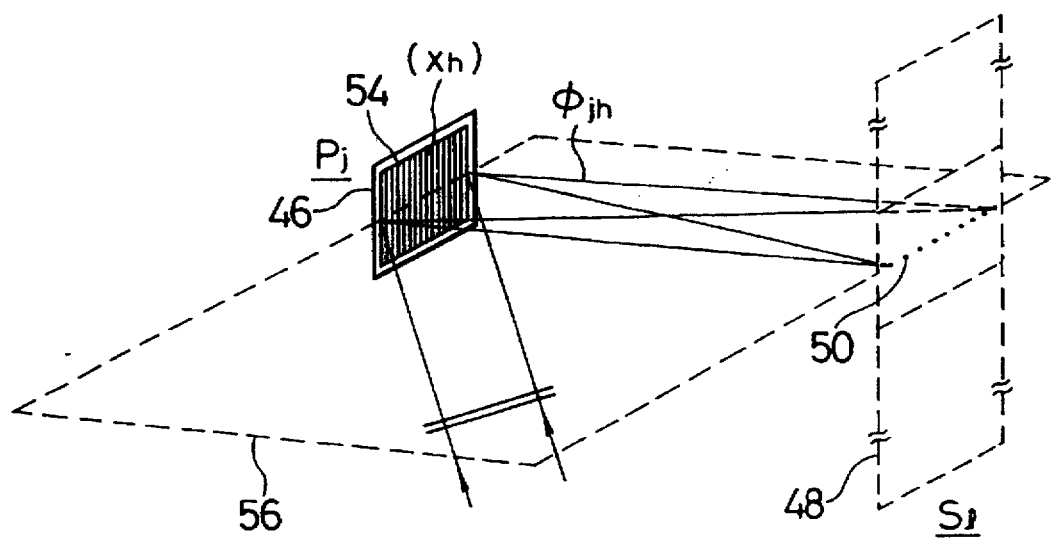
FIG. 23 is an explanatory diagram of a calculating method of a phase distribution to realize the deflecting function of FIG. 22.
Figure 25A:
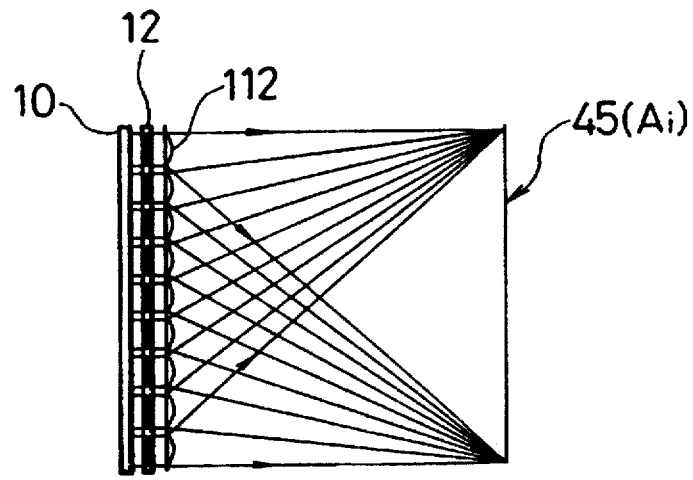
FIGS. 25A and 25B are explanatory diagrams of deflecting states when optically enlarging an image in the vertical direction by providing a Lenticular lens.
Figure 25B:
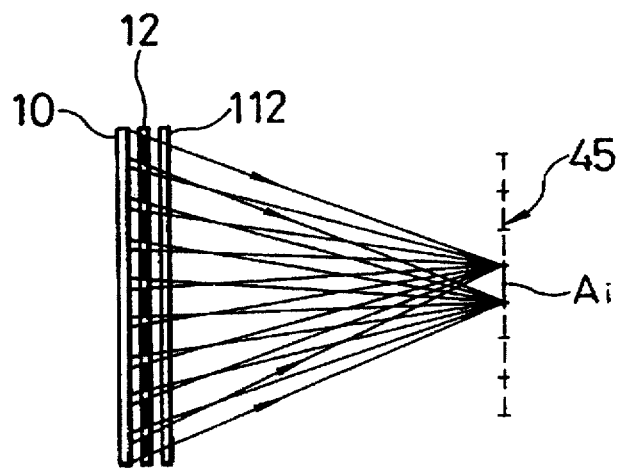

FIG. 23 shows a calculating method of a phase distribution to realize the deflecting function shown in FIG. 22. A calculating method of a phase distribution in the 1-pixel phase display section 46 of the corresponding pixel $P_i$ is shown with respect to the relation with the region $S_l$ of one virtual opening 48. In this case, a horizontal plane 56 which is perpendicular to the 1-pixel phase display section 46 and the virtual opening 48 is set. A plurality of virtual point light source 50 are arranged in the horizontal direction on the virtual opening 48 along the horizontal plane 56. The virtual reference light 52 is also set. In this state, phase distributions are calculated by the equations (3) and (4) every pixels 54 for phase display constructing the 1-pixel phase display section 46 with respect to all of the virtual point light sources 50. The 2-dimensional image data is the same as that in FIG. 21. A plurality of 2-dimensional image data $G_1$ to $G_n$ in the case where the virtual opening regions $S_1$ to $S_n$ were seen as visual points are prepared and time-divisionally displayed. Therefore, the virtual openings 48 shown in FIG. 22 change in the horizontal direction with the elapse of time in association with the switching of the 2-dimensional image data $G_1$ to $G_n$. Accordingly, the calculation of phase distributions in FIG. 23 is executed with respect to the virtual opening regions whose positions change with the elapse of time in association with the switching of the dimensional images $G_1$ to $G_n$. Therefore, with respect to an arbitrary corresponding pixel $P_{ij}$, phase distributions to $\Phi_{j,n}$ are calculated so as to deflect the lights from the pixels into the virtual openings 48 of the different regions $S_1$ to $S_1$ in correspondence to the 2-dimensional image display by the time-division. Consequently, as shown in FIG. 24, the phase distribution data which is used by the time-divisional display of every corresponding pixel is stored in the phase distribution storing table in case of an-image having a parallax in the horizontal direction. In the stereoscopic display of the invention using the phase distributions of the divided 2-dimensional images, even when the 2-dimensional images of different visual directions are switched, all of the deflecting directions in the vertical direction are equal and the deflecting directions in the horizontal direction are different every 2-dimensional image. Thus, the light doesn't diffuse in the vertical direction and it is further necessary to optically enlarge the image in the vertical direction upon reconstruction of a solid image. Therefore, as shown in a side elevational view of FIG. 25A and a plan view of FIG. 25B, subsequent to the phase distribution display section 12, for example, a Lenticular lens 112 is provided as an optical device having a visible region enlarging function in the vertical direction. The image is diffused in the vertical direction, thereby producing the visible region 45.

(First embodiment of the invention in which the image division is not executed)

Figure 26:
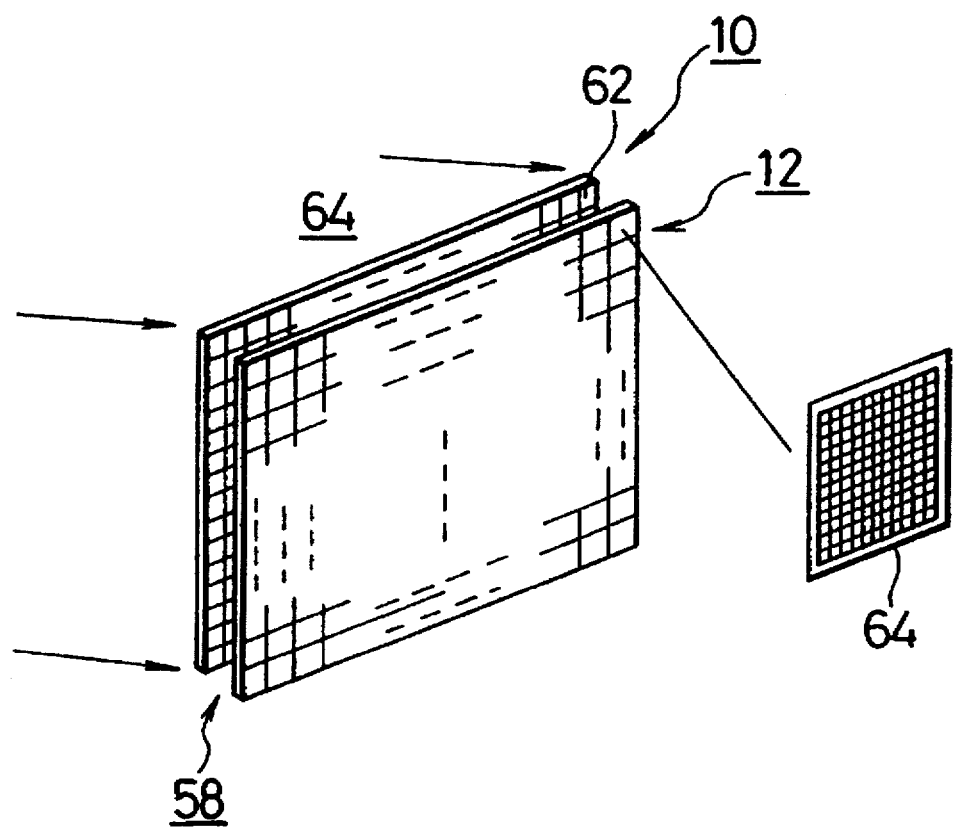
FIG. 26 is an explanatory diagram showing the first embodiment of the invention for stereoscopically displaying a solid image with parallaxes in the horizontal and vertical directions.

FIG. 26 shows a construction of a display apparatus of the first embodiment of a stereoscopic display apparatus of the invention. This embodiment is characterized in that a liquid crystal display is used as a 2-dimensional image display section 10 and a liquid crystal display is also used as a phase distribution display section 12. The liquid crystal display used as a 2-dimensional image display section 10 has the pixels of the number which are necessary to display 2-dimensional images and changes a transmission light amount of the incident reproduction light. The 2-dimensional image having parallaxes in the horizontal and vertical directions shown in FIG. 17 or the 2-dimensional image having a parallax in only the horizontal direction shown in FIG. 21 is displayed in the 2-dimensional image display section 10. Each of phase cells 64 of the liquid crystal display which is used in the phase distribution display section 12 has a very small pixel size such as 1.0 μm as partially enlargedly shown in FIG. 26 as compared with one pixel cell 622 of the 2-dimensional image display section 10. In case of a stereoscopic display of an image having parallaxes in the horizontal and vertical directions, the phase distribution data in FIG. 16 is supplied and phase information (interference fringe) is displayed in such a micropixel of the phase display section 12. On the other hand, in case of a stereoscopic display of an image having a parallax in only the horizontal direction, the phase distribution data shown in FIG. 20 is supplied and phase information (interference fringe) is displayed. The phase display section 12, accordingly, modulates the light from the 2-dimensional display section 10, thereby diffracting the light toward a predetermined virtual opening portion.

Figure 27:
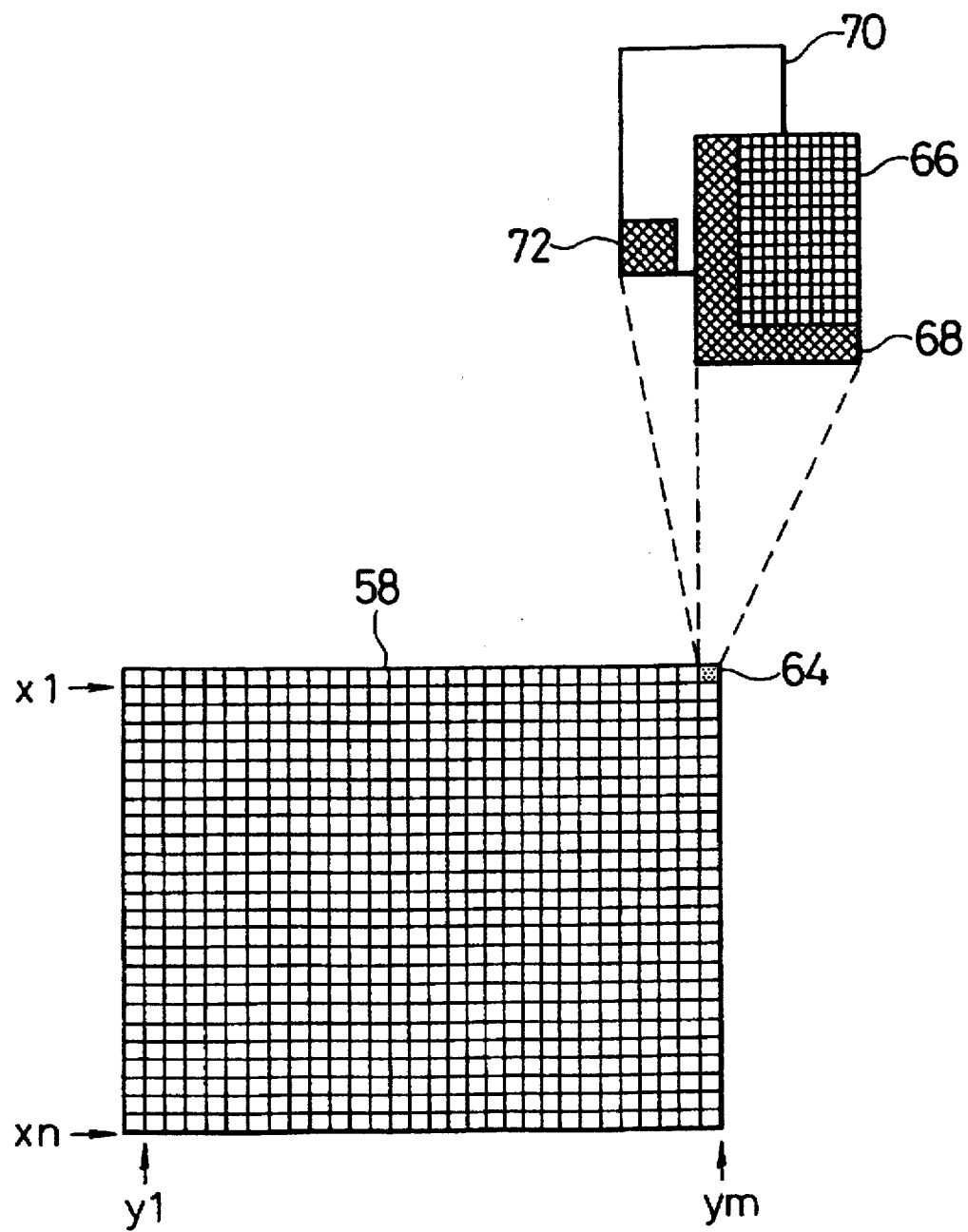
FIG. 27 is an explanatory diagram of a whole construction of a display apparatus which is used in the first embodiment of FIG. 26.

FIG. 27 shows a whole construction of a display apparatus 58 with which the 2-dimensional image display section 10 and the phase distribution display section 12 shown in FIG. 26 are integrated. In the display apparatus 58, the display sections 12 and 10 are overlapped in the visual recognizing direction and the phase cells 64 are arranged in a matrix form. As enlargedly shown, the phase cell 64 is constructed by pixels 66 for phase display which were further finely divided and a driving circuit 68 to drive the pixels 66. On the other hand, the pixel cells 62 of the 2-dimensional image display section construct one pixel 70 for displaying a 2-dimensional image. A driving circuit 72 is provided in the cell 70. Further, for the liquid crystal display apparatus 58, address lines extending in the horizontal direction are indicated by $x_1$ to $x_n$ and address lines extending in the vertical direction are shown by $Y_1$ to $y_n$.

Figure 28:
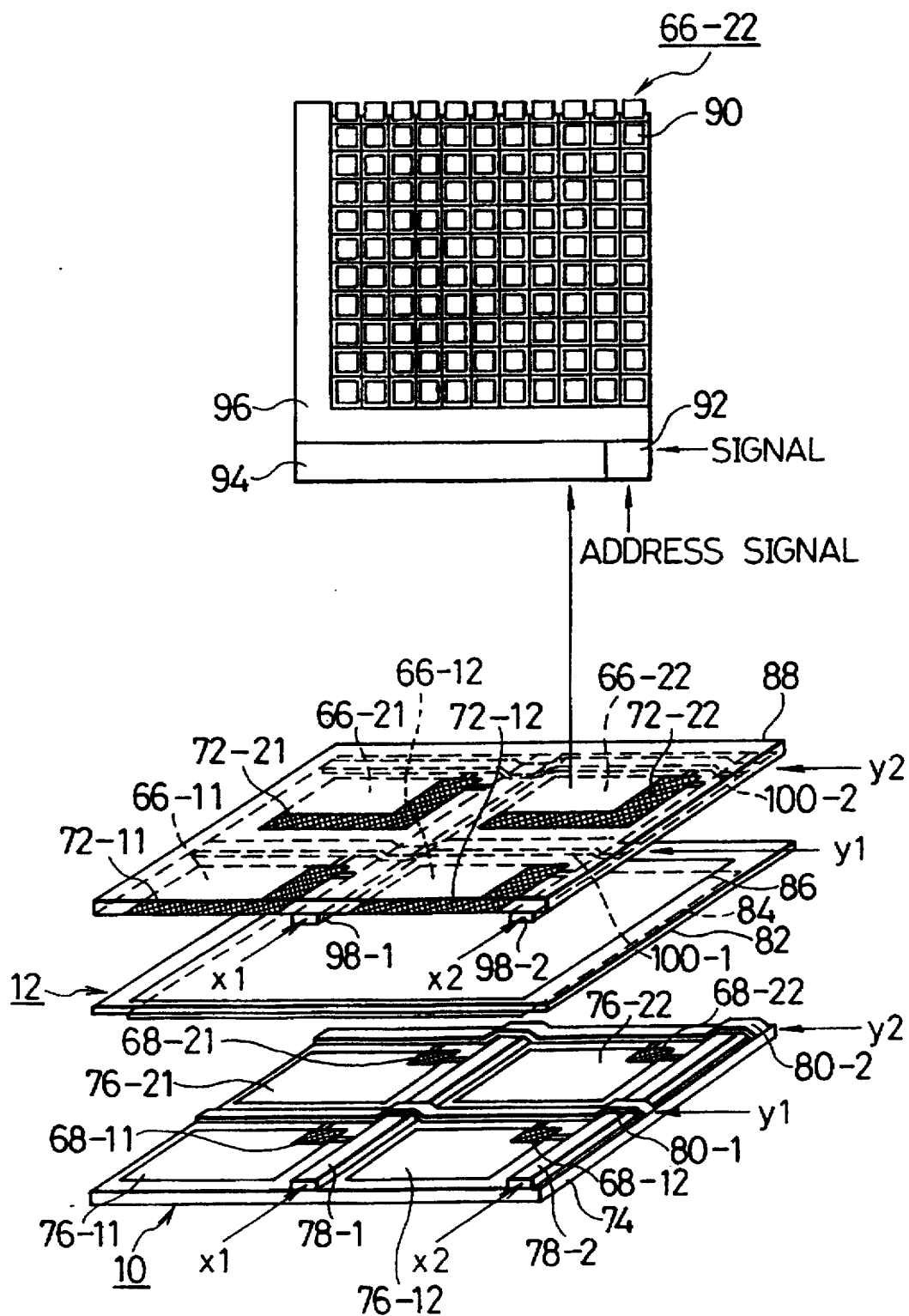
FIG. 28 is an explanatory diagram showing a detailed structure of the display apparatus of FIG. 27 with respect to four cells.

FIG. 28 shows a detailed structure of the display apparatus 58 in FIG. 27 with respect to four cells as an example. The lower layer of the display apparatus 58 constructs a liquid crystal display as a 2-dimensional image display section 10 and the upper layer constructs a liquid crystal display as a phase distribution display section 12. First, in the 2-dimensional image display section of the lower layer, four pixel electrodes 76-11 to 76-22 are arranged on a glass substrate 74. Driving circuits 68-11 to 68-22 are formed in the pixel electrodes 76-11 to 76-22. Further, address lines 78-1 and 78-2 of $x_1$ and $x_2$ and signal lines 80-1 and 80-2 of $y_1$ and $y_2$ are arranged around the pixel electrodes 76-11 to 76-22. On the other hand, on the upper side of the 2-dimensional image display section 10, a glass substrate 82 in which a common electrode 84 is formed on the lower surface is arranged. When a liquid structure of the 2-dimensional image display section 10 is formed, a liquid crystal is interposed between the glass substrates 74 and 84 shown in the diagram so as to sandwich the upper and lower surfaces by deflecting plates (PL), thereby obtaining a structure of the liquid crystal display as a 2-dimensional image display section 10.

In the phase distribution display section 12 of the upper layer, a common electrode 86 is provided on the upper side of a common glass substrate 82, and cell electrode sections 66-11 to 66-22 are further formed on the lower surface side of a top glass substrate 88. As partially shown as a cell electrode section 66-22, micro pixel electrodes 90 are two-dimensionally arranged and a gate switch 92, a decoding circuit 94, and a signal generating circuit 96 are formed as a driving circuit. Driving circuits 72-11 to 72-22 are formed in the cell electrode portions 66-11 to 66-22 of the glass substrate 88. Further, address lines 98-1 and 98-2 shown by $x_1$ and $x_2$ and signal lines 100-1 and 100-2 indicated by $y_1$ and $y_2$ are arranged for the glass substrate 88.

The phase distribution display section 12 can realize a liquid crystal display by interposing a liquid crystal between the glass substrates 82 and 88 so as to be sandwiched by deflecting plates (PL). For example, a nematic liquid crystal is used as a liquid crystal which is used in each of the display sections 10 and 12. Further, the liquid crystal on the side of the phase distribution display section 12 has a homogeneous orientation. When the 2-dimensional image display section 10 is driven, the pixels on the horizontal line are turned on by the address lines 78-1 and 78-2 in the x direction and image signals are given to the pixels by the signal lines 80-1 and 80-2 in the y direction, thereby driving the display section 10. In a manner similar to the display section 12, the cells on the horizontal line are turned on by the address lines 98-1 and 98-2 in the x direction and the phase distribution signals are given to the cells by the signal lines 100-1 and 100-2 in the y direction, thereby driving the phase distribution display section 12. A reproduction light is inputted from the side of the glass substrate 74 of the lower layer. In the liquid crystal display as a 2-dimensional image display section 10, since a deflecting angle changes in dependence on the inputted pixel signal, a transmission amount of the light can be controlled. In the liquid crystal display of the phase distribution display section 12, since a birefringence amount changes depending on the inputted phase distribution signal, the deflecting direction can be controlled by changing the phase.

(Second embodiment of the invention based on the divided 2-dimensional images)

Figure 29:
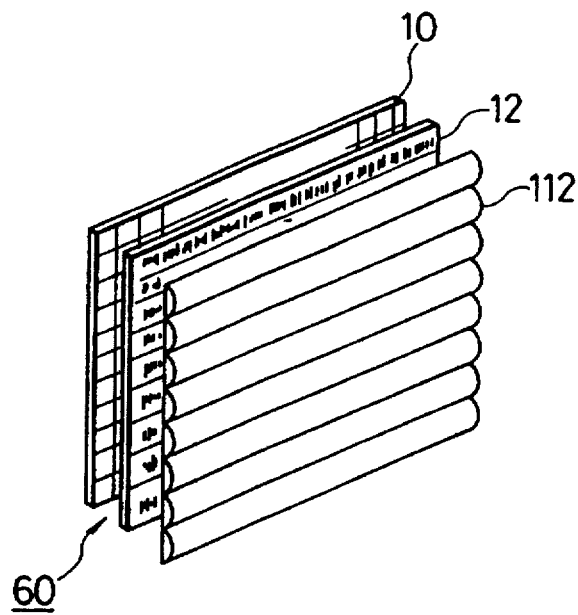
FIG. 29 is an explanatory diagram showing the second embodiment of the invention for stereoscopically displaying a solid image with a parallax in the horizontal direction.

FIG. 29 shows the second embodiment in which a 2-dimensional image having a parallax in the horizontal direction is further divided and an image type holographic stereogram having a parallax in the horizontal direction is stereoscopically displayed. The 2-dimensional image display section 10 is constructed by the liquid crystal display and the phase distribution display section 12 is also constructed by a liquid crystal display. The 2-dimensional image display section 10 can use the same liquid crystal display as that shown in the first embodiment of FIG. 26. On the other hand, the phase distribution display section 12 can use the liquid crystal display in which small pixels are arranged in the horizontal direction and large pixels are arranged in the vertical direction. A pixel size in the vertical direction is substantially equal to the pixel size of the 2-dimensional image display section 10. In case of the second embodiment, since the 2-dimensional image is divided, the light emitted from the pixel is deflected in only the horizontal direction by the phase distribution display section 12 and the light cannot be deflected in the vertical direction. Therefore, since the image in the vertical direction cannot simultaneously be seen, for instance, the Lenticular lens 112 in which a plurality of cylindrical lenses are arranged is provided as an optical device having a visible region enlarging function in the vertical direction, thereby enlarging the visible region in the vertical direction.

Figure 30:
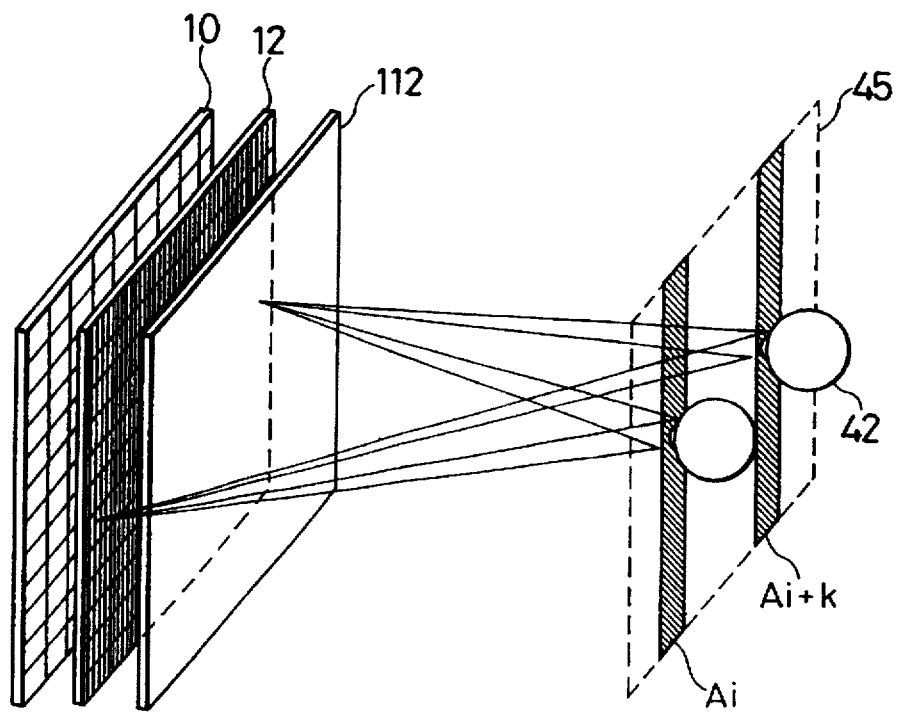
FIG. 30 is an explanatory diagram showing the recognition of a solid image according to the second embodiment.

FIG. 30 shows a visual recognizing range of a solid image in the second embodiment. The display light from the 2-dimensional image display section 10 which was diffused in only the horizontal direction by the phase distribution display section 12 is enlarged in the vertical direction of the visible region 45 by, for example, the Lenticular lens 112 as a unidirectional diffusing screen. Therefore, the observer can recognize a solid image by seeing two 2-dimensional images of different visual point positions when they are seen from, for instance, a virtual opening region $A_i$ and another virtual opening region $A_{i+k}$ as after-image displays by the time-division.

Figure 31:
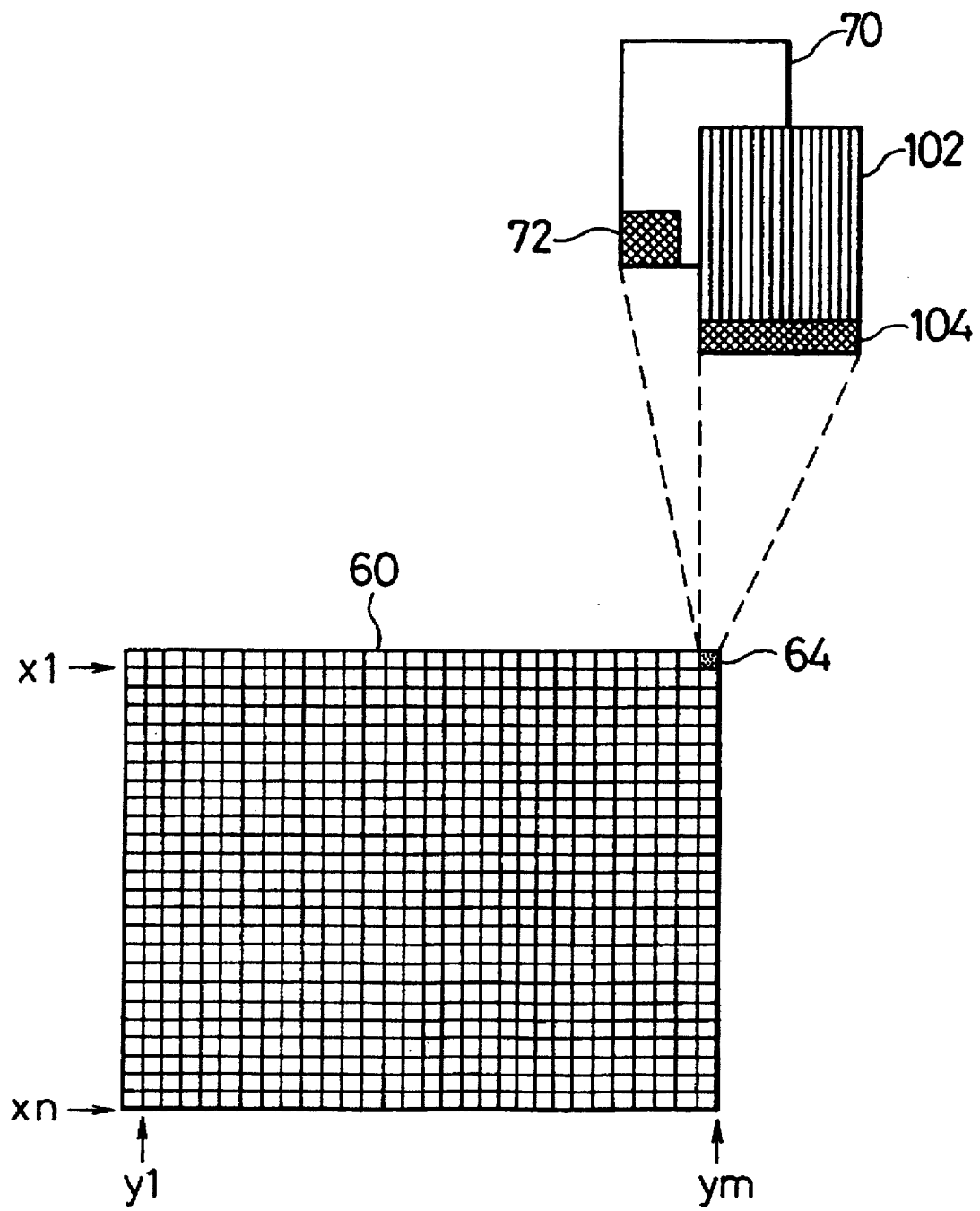
FIG. 31 is an explanatory diagram of a whole construction of a display apparatus which is used in the second embodiment of FIG. 29.

FIG. 31 is an explanatory diagram showing a whole construction of a display apparatus comprising the 2-dimensional image display section 10 and the phase distribution display section 12 in the second embodiment of FIG. 29. The 2-dimensional image display section 10 side is the same as that in the first embodiment of FIG. 27. On the other hand, as partially shown as a phase cell 64, with regard to the phase distribution display section 12, pixels 102 for phase display which are short in the horizontal direction and each of which has almost the same size as that of the pixel 70 for displaying a 2-dimensional image are arranged in the vertical direction, and a driving circuit 104 is further integratedly provided.

Figure 32:
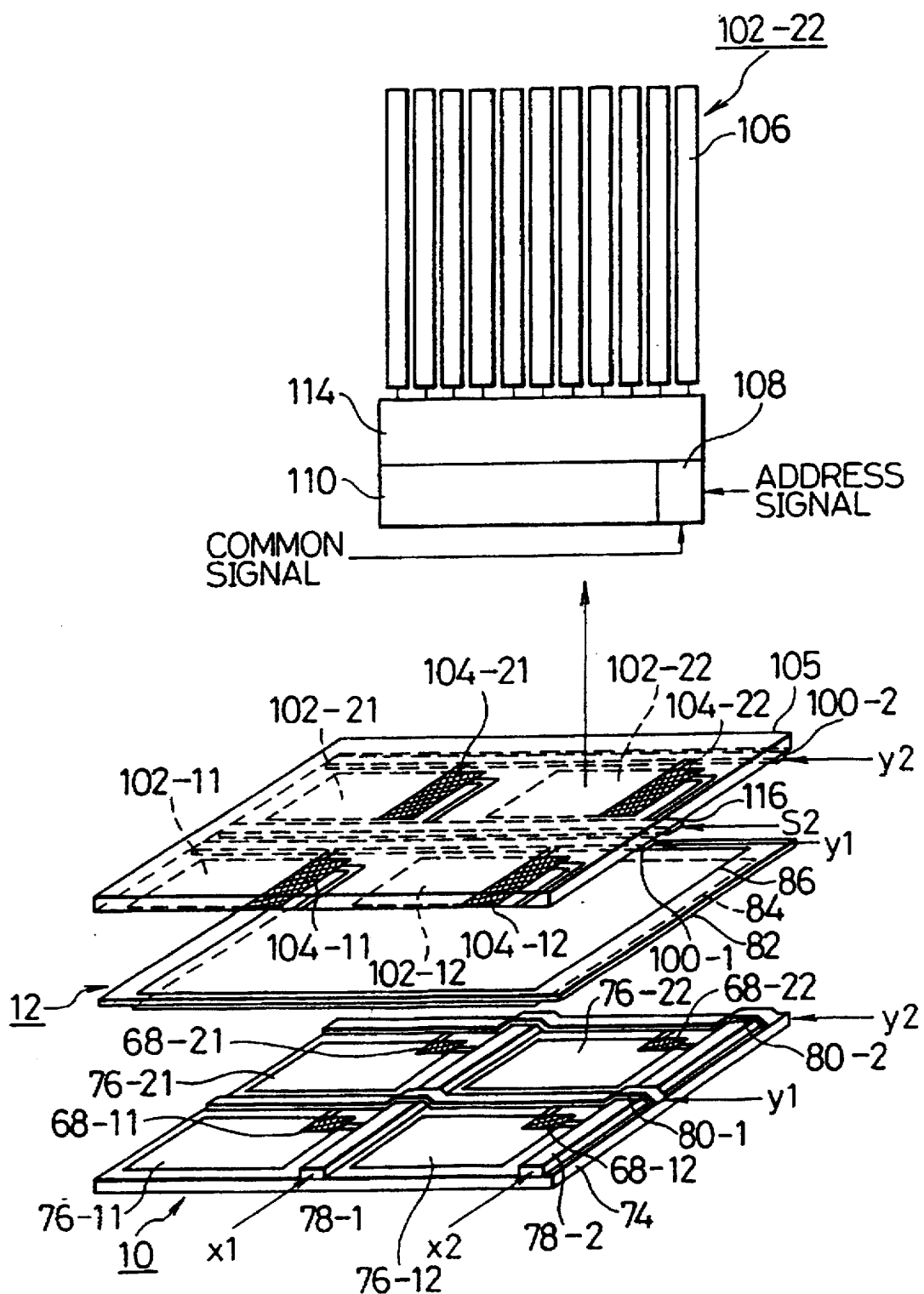
FIG. 32 is an explanatory diagram showing a detailed structure of the display apparatus of FIG. 31 with respect to four cells.

FIG. 32 shows a specific structure of a display apparatus 60 in FIG. 31 with respect to four cells. The 2-dimensional image display section 10 of the lower layer is substantially the same as that in the first embodiment of FIG. 28. With respect to the phase distribution display section 12 of the upper layer, a plurality of pixel electrodes 106 each of which is short in the horizontal direction and has a width of one pixel in the vertical direction are arranged in each of four cell electrode sections 102-11 to 102-22 as shown in the cell electrode section 102-22 which was particularly shown in the diagram. A gate switch 108, a decoding circuit 110, and a signal generating circuit 114 are further provided as a driving circuit. A liquid crystal sandwiched by upper and lower deflecting plates (PL) is interposed between the intermediate glass substrate 82 and an upper glass substrate 105. Further, the Lenticular lens 112 shown in FIG. 29 is disposed on the glass substrate 105 of the upper layer. As will be obviously understood from the deflecting direction upon reconstruction by the divided 2-dimensional images shown in FIG. 24, with respect to the phase cells of the phase distribution display section 12 in the second embodiment, all of the cells arranged in the vertical direction have the same phase distribution. Therefore, the cells on the same vertical line are turned on by the signal lines 100-1 and 100-2 extending in the vertical direction and the phase distribution information is simultaneously given to each cell by a signal line 116 in the Y direction, thereby driving the phase distribution display section 12.

(Modification of the second embodiment)

Figure 33:
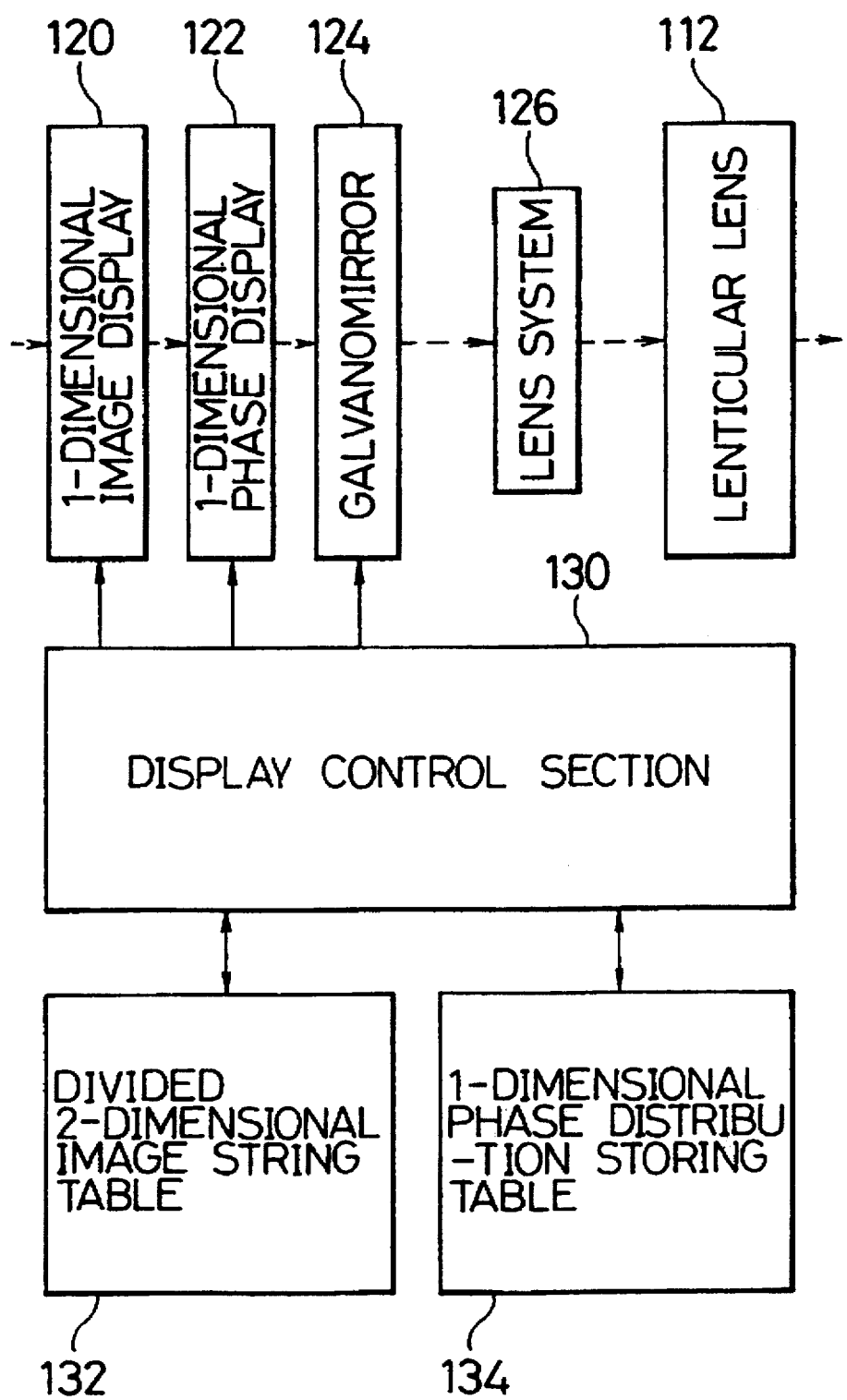
FIG. 33 is an explanatory diagram showing a modification of the second embodiment using a 1-dimensional display.

FIG. 33 is an explanatory diagram showing a modification of the second embodiment of the invention and is characterized in that a 1-dimensional liquid crystal device is used as a 2-dimensional image display section and a phase distribution display section. First, the optical system comprises: a 1-dimensional image display 120; a 1-dimensional phase display 122; a galvano mirror 124; a lens system 126; and the Lenticular lens 112. The 1-dimensional image display 120, the 1-dimensional phase display 122, and the galvano mirror 124 are controlled by a display control section 130. A divided 2-dimensional image storing table 132 and a 1-dimensional phase distribution storing table 134 are provided for the display control section 130. As shown in FIG. 34, 2-dimensional images $DG_{11}$ to $DG_{1n}$, . . . , $DG_{n1}$ to $DG_{nn}$ which are obtained by dividing the 2-dimensional image of each region are stored into the divided 2-dimensional image storing table 132 every virtual opening areas $A_1$ to $A_n$.

Figure 35:
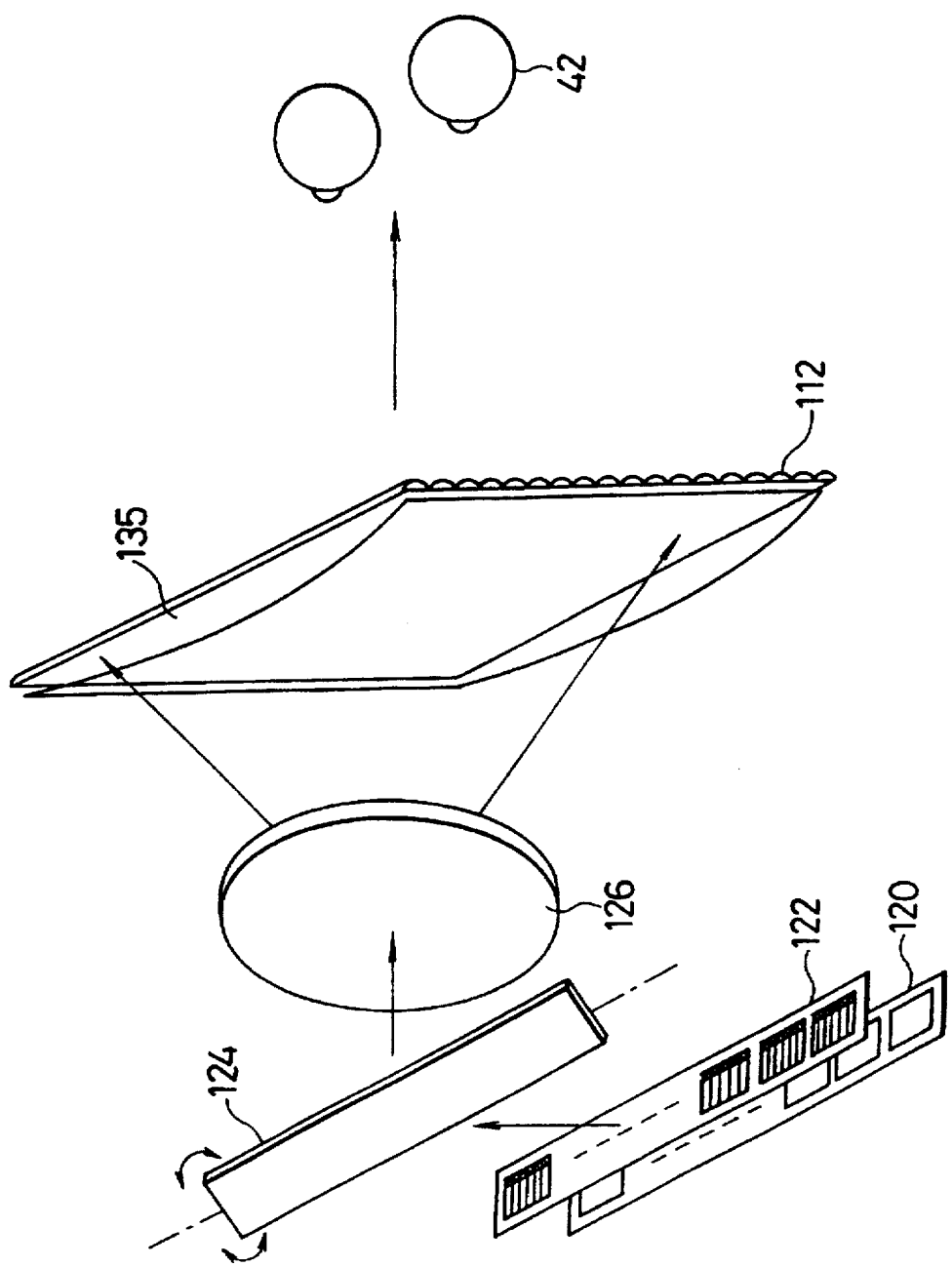
FIG. 35 is an explanatory diagram of an optical system of the modification of FIG. 33.
Figure 36:
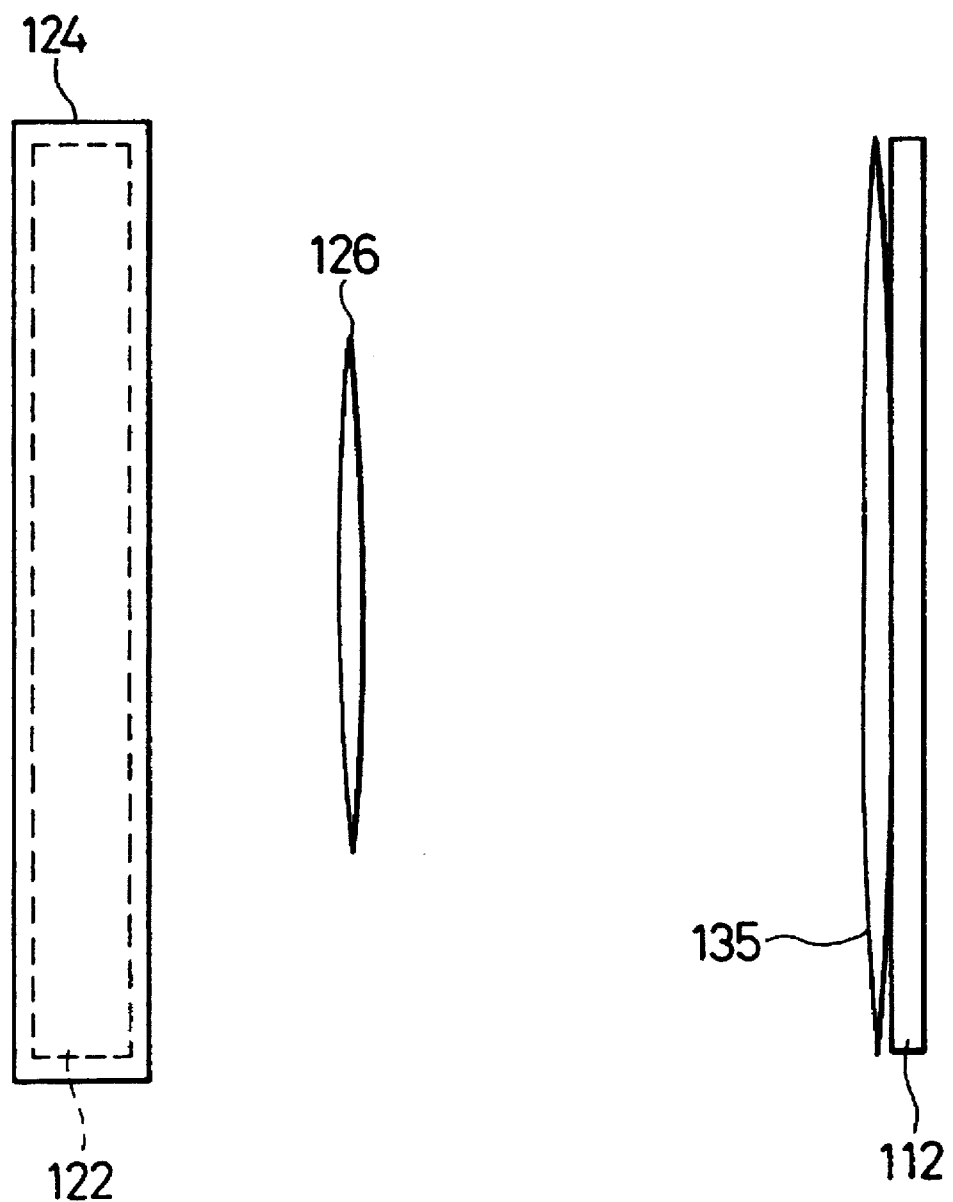
FIG. 36 is a plan view of FIG. 35.

FIG. 35 picks up and shows the optical system in FIG. 33. A display light from each pixel of the 1-dimensional image display 120 is subjected to the deflection by the phase distribution displayed in the corresponding 1-dimensional phase display 122 and enters the galvano mirror 124. The 1-dimensional display image scanned in the vertical direction by the galvano mirror 124 is formed onto the Lenticular lens 112 and the visible region is enlarged in the vertical direction, so that an observer 42 can see a solid image. FIG. 36 shows a plan view of FIG. 35. The 1-dimensional phase display 122 and the 1-dimensional image display 120 are located below the galvano mirror 124. A cylindrical lens 135 having an optical power in only the horizontal direction is further arranged behind the Lenticular lens 112.

Figure 37:
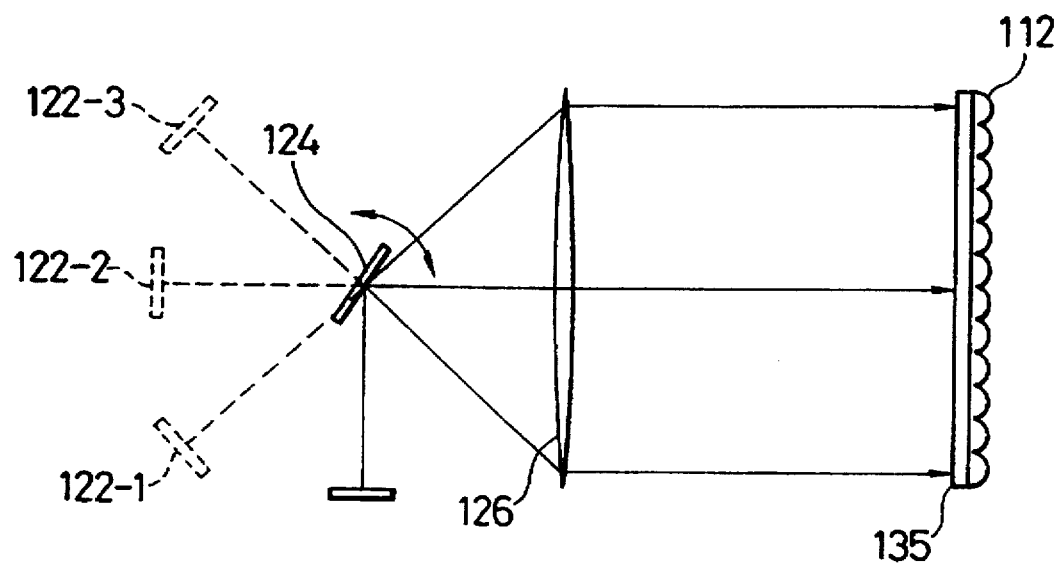
FIG. 37 is an explanatory diagram showing the deflection scan in the vertical direction by a galvano mirror in FIG. 35.

FIG. 37 shows the vertical scan of the galvano mirror 124 in FIG. 35. When the galvano mirror 124 rotates, a deflecting operation to the lens 126 is performed within a range from a virtual image 122-1 to a virtual image 122-3. The light is inputted as a scan light in the vertical direction by the lens 126 into the Lenticular lens 112 having the cylindrical lens 135 on the rear side.

(Third embodiment of the invention using an acoustic optical device)

Figure 38:
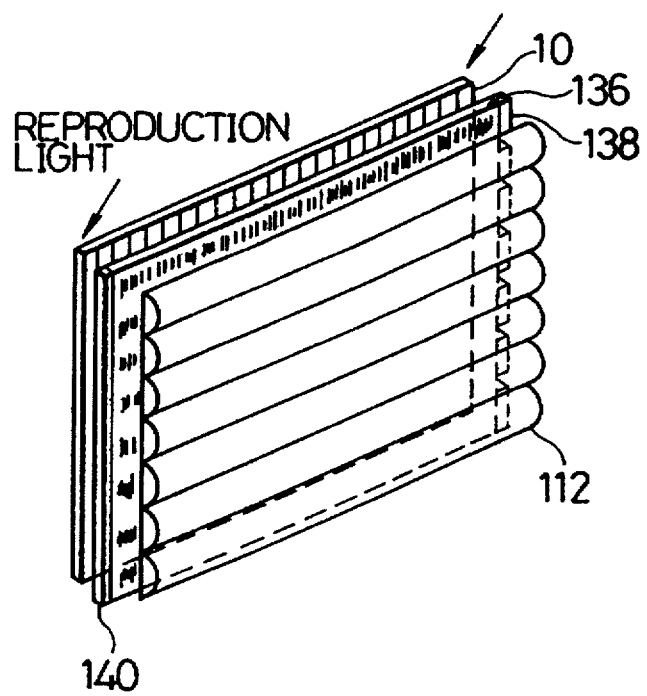
FIG. 38 is an explanatory diagram of the third embodiment of the invention using an acoustic optical device.

FIG. 38 shows the third embodiment of the invention using an acoustic optical device (AOM device) as a phase distribution display. The same 2-dimensional image display section 10 as that in each of the first and second embodiments is used. In place of the phase distribution display section, an acoustic optical device 136 is provided subsequent to the 2-dimensional image display section 10. For example, the acoustic optical device 136 is made of a crystal of $TaO_2$ and has a structure such that a transducer 138 as an acoustic vibrator for converting an electric signal into an acoustic signal is provided on one side and an absorbing material 140 for absorbing a sound wave is provided on the opposite side. The acoustic optical device 136 generates a wave which is propagated in the horizontal direction which is determined by the arranging position of the transducer 138 and generates a 1-dimensional phase distribution similar to that in the second embodiment shown in FIG. 29. The Lenticular lens 112 is provided to enlarge the visible region in the vertical direction.

Figure 39:
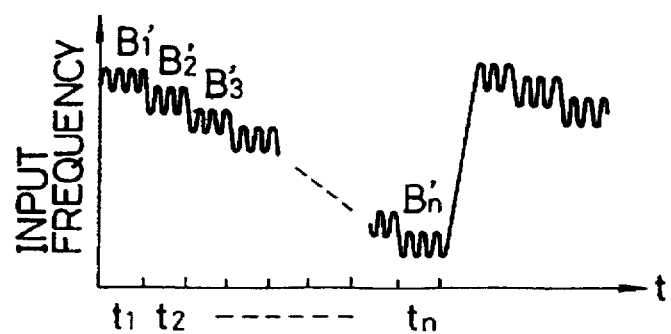
FIG. 39 is a timing chart showing a frequency distribution signal to drive the acoustic optical device in FIG. 38.
Figure 40:
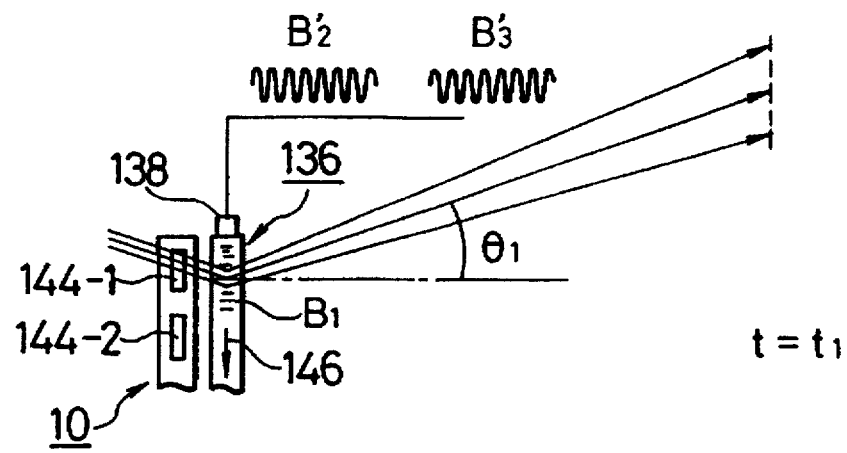
FIG. 40 is an explanatory diagram showing the deflecting operation at time $t_1$ of the acoustic optical device.
Figure 41:
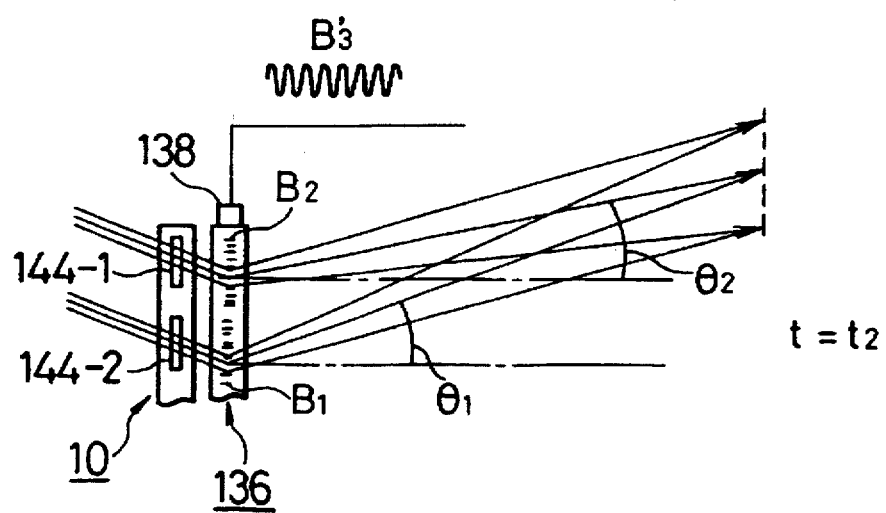
FIG. 41 is an explanatory diagram showing the deflecting operation at time $t_2$ of the acoustic optical device.

FIG. 39 is a time chart showing the driving operation of the acoustic optical device 136 in FIG. 38. That is, an electric signal of a frequency distribution B1' is given to the transducer 138 at time t1, thereby producing a corresponding spatial frequency distribution B1 in the acoustic optical device 136 as shown in FIG. 40. By the distribution of refractive indices by the spatial frequency distribution B1, for example, the light from a pixel 144-1 is diffracted at a desired angle $\theta_1$ and the light from the pixel 144-1 can be seen from a certain virtual opening. An electric signal of a frequency distribution B2' is subsequently given to the transducer 138 at a timing of time t2 in FIG. 39, thereby producing a spatial frequency distribution B2 into the acoustic optical device 136. Therefore, as shown in FIG. 41, the light from the pixel 144-1 is emitted at an angle of $\theta_2$ due to the refractive index distribution by the spatial frequency distribution B2 in the acoustic optical device 136. The light from the pixel 114-1 can be seen from a virtual opening different from that at time t1. In this instance, since the refractive index distribution of the spatial frequency distribution B1 produced at time t1 has been moved to the corresponding position of a next pixel 144-2, so that the light from the pixel 144-2 is emitted at an angle $\theta_1$. Therefore, both of the lights from the pixels 144-1 and 144-2 can be seen at the position where the laser beams emitted at the angles $\theta_1$ and $\theta_2$ are overlapped. Although the refractive index distribution which is produced on the acoustic optical device 136 moves with the elapse of time, since the light from a micro pixel is seen, by reconstructing the images in accordance with the synchronization depending on the pixel array, a flow of image doesn't occur. As mentioned above, by sequentially changing the deflecting directions of the pixel information in accordance with the frequency distributions B1' to Bn' of the electric signals which are applied to the acoustic optical device 136, one 2-dimensional image can be seen at the same position of the virtual opening. By similarly time-divisionally reconstructing the 2-dimensional images when they are seen from a plurality of visual point positions, a solid image having a parallax in the horizontal direction can be stereoscopically displayed.

Figure 42:
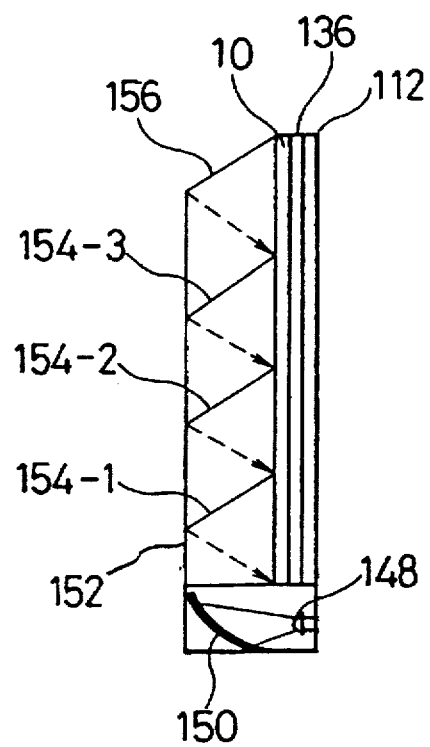
FIG. 42 is an explanatory diagram of the third embodiment integrated with a light source.
Figure 43A:
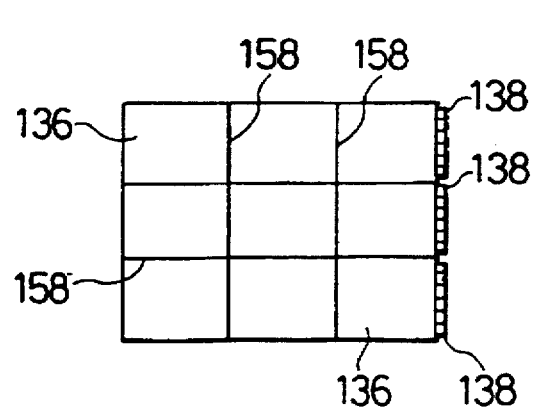
FIGS. 43A and 43B are explanatory diagrams showing constructions each for increasing an area of the acoustic optical device.
Figure 43B:
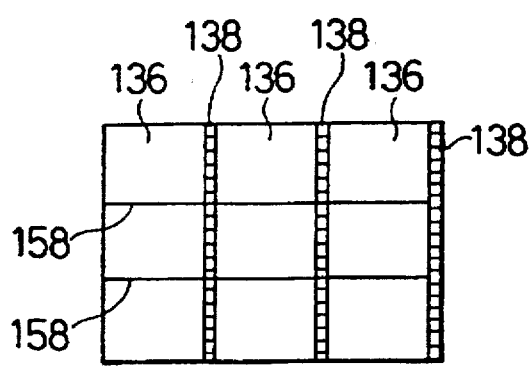

FIG. 42 shows an embodiment including an illuminating section of the third embodiment using an acoustic optical device. The light from a light source 148 of a semiconductor laser is converted into the parallel light by an aspheric mirror 150 and enters a photoconductive plate 152. Half mirrors 154-1 to 154-3 and a mirror 156 are obliquely arranged in the photoconductive plate 152, thereby allowing the reproduction lights to obliquely enter the liquid crystal display as a 2-dimensional image display section 10 as shown by arrows of broken lines. Reflectances of the half mirrors 154-1 to 154-3 are different in order to equalize the intensities of incident lights. On the other hand, in the case where a large device cannot be obtained because of a difference of the materials which are used in the acoustic optical device, as shown in FIG. 43A and 43B, small acoustic optical devices are combined, thereby realizing an acoustic optical device of a large area. In this case, as shown in FIG. 43A, a sound wave from the transducer 138 can be also propagated to the next acoustic optical device 136 by an acoustic transferring material 158. As shown in FIG. 43B, a plurality of acoustic optical devices 136 each having the transducer 138 can be also combined.

Figure 44:
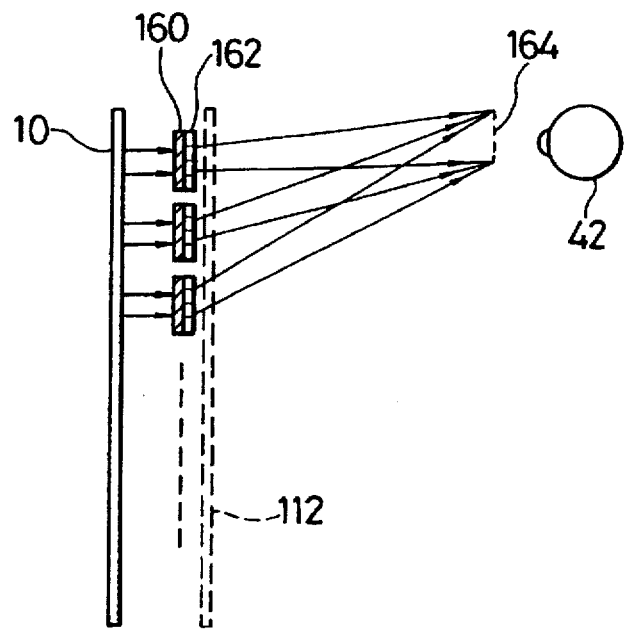
FIG. 44 is a principle constructional diagram of the fourth embodiment of the invention using a deflector and a directional diffusing functional device.

VII. Fourth embodiment of the invention using a deflecting section and a directional radiating functional device FIG. 44 shows a fundamental construction of the fourth embodiment according to the invention. In the display of the phase distribution in the first to third embodiments, although the pixels constructing the 2-dimensional image are diffracted so as to be seen from the corresponding virtual opening, such a function is substantially the same as the directional radiating function for deflecting the laser beam and for radiating the light with a certain extent. Therefore, in the fourth embodiment, an image type holographic stereogram is formed by a deflector 160 and a directional radiating functional device 162 in place of the phase display section. In this case, since the images at different positions on the 2-dimensional image display 10 can be allowed to be seen by the eyes of the observer 42, a solid image can be recognized by using a parallax of both eyes and a vergence of two eyes.

Figure 45:
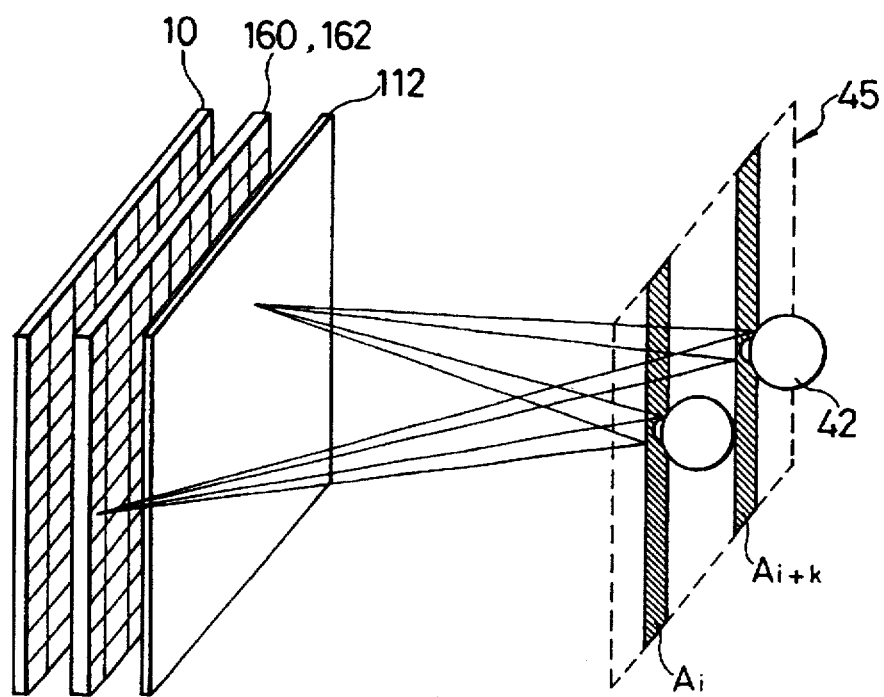
FIG. 45 is an explanatory diagram of a reconstructing state for recognizing a solid image by a parallax in the horizontal direction in the fourth embodiment.

FIG. 45 shows a state of a stereoscopic display of FIG. 44. The light from each pixel of the 2-dimensional image display 10 is deflected in the horizontal direction by a combination of the deflector 160 and the directional radiating functional device 162. Further, the light is diffused in the vertical direction by the Lenticular lens 112 provided as necessary. Therefore, in the visible range 45 in which the virtual opening is located, the left eye of the observer 42 observers the 2-dimensional image seen from the virtual opening area $A_1$, while the right eye observes the 2-dimensional image seen from the virtual opening area $A_{i+k}$. Thus, a solid image due to the parallax between both eyes and a vergence between both eyes can be recognized.

Figure 46:
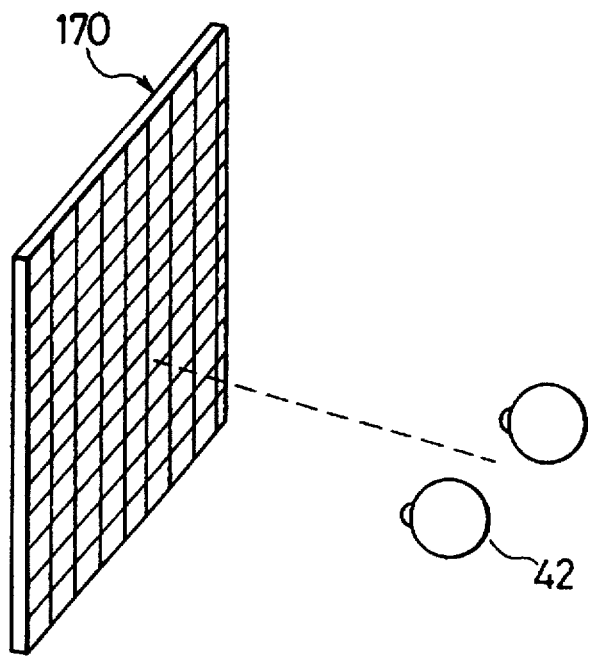
FIG. 46 is an explanatory diagram showing a whole construction of a display apparatus for performing the beam deflection in the second embodiment.
Figure 47:
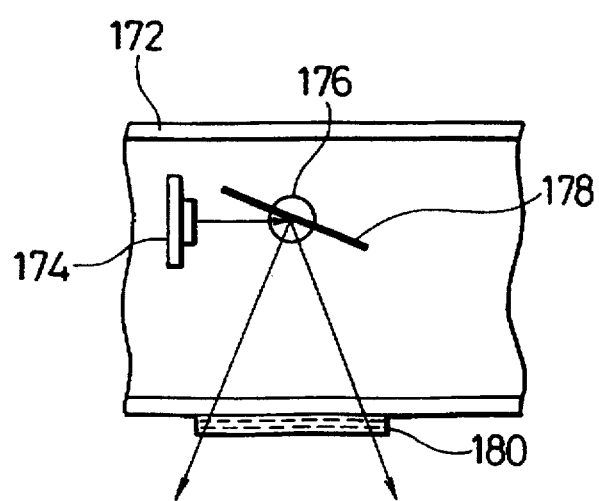
FIG. 47 is a plan view showing an internal structure of FIG. 46 with respect to one pixel.
Figure 48:
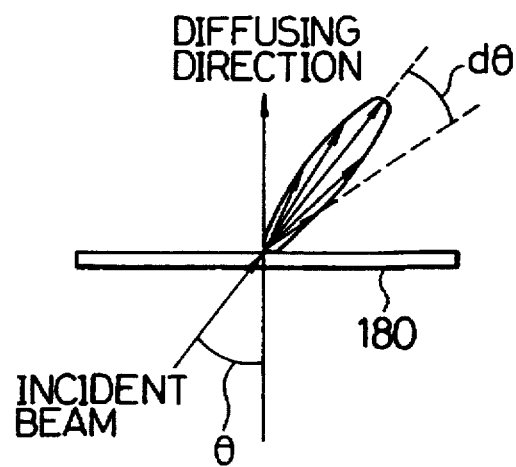
FIG. 48 is an explanatory diagram of a deflecting function according to a directional diffusing functional device in FIG. 47.

FIG. 46 shows a display apparatus 170 with which the deflector 160 and the directional radiating functional device 162 shown in FIG. 44 are integrated. An internal structure when it is seen as a plan view is taken out and shown in FIG. 47. In FIG. 47, a light emitting device 174, a galvano mirror 178 which is driven by a motor 176, an a directional radiating functional device 180 execute the display of one pixel by a group in a lump. The light emitted from the light emitting device 174 is deflected by the galvano mirror 178 and enters the directional radiating functional device 180. Practically speaking such such a light enters a thin diffusing plate. The light which entered the directional radiating functional device using a thin diffusing plate is slightly diffused onto the line of the incident laser beam and is emitted as shown in FIG. 48.

Returning to FIG. 47, the light emitted from the directional radiating functional device 180 is extended toward the virtual opening. As shown in FIG. 46, the observer 42 can see the 2-dimensional image at the position of the virtual opening by the light emitted from the display apparatus 170. A solid image can be perceived by seeing different images by the right and left eyes.

Figure 49:
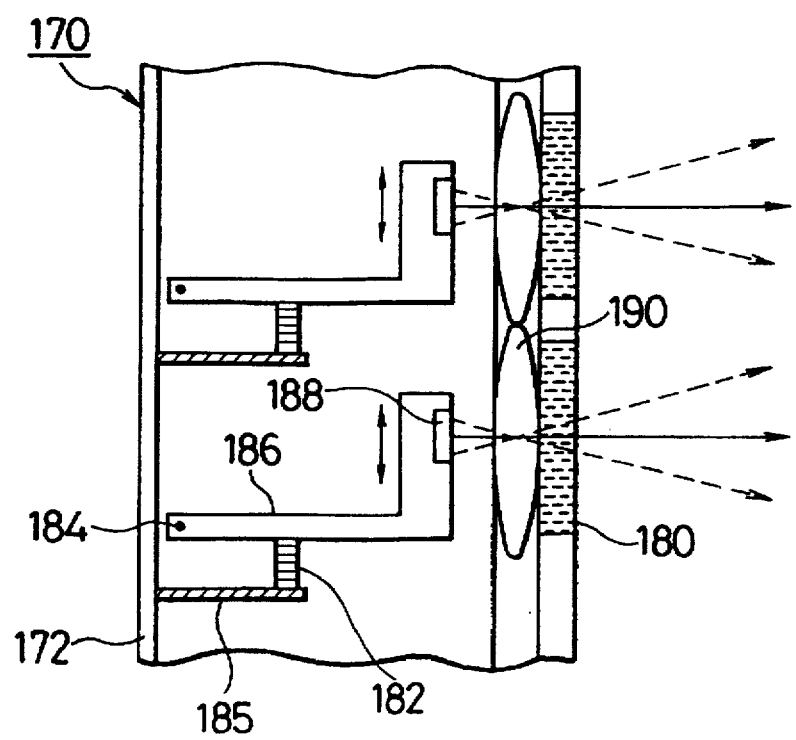
FIG. 49 is an explanatory diagram of a structure of a display to deflect a beam by driving a light emitting device.

FIG. 49 shows an embodiment in which a deflecting function was realized by changing the relative positions of the light emitting device and the lens. Two pixels are picked up and shown in the diagram, when considering the pixels on the lower side, piezoelectric devices 182 are attached to a supporting member 185, a lever 186 supported by a fulcrum 184 is attached, and a light emitting device 188 provided for the lever 186 can be moved in the direction perpendicular to the optical axis by the driving of the piezoelectric device 182. A lens 190 and the directional radiating functional device 180 using a thin diffusing plate are arranged in front of the light emitting device 188. Therefore, by changing the relative position of the light emitting device 188 for the lens 190 by the driving of the piezoelectric device 182, the light from the light emitting device 188 can be deflected.

Figure 50:
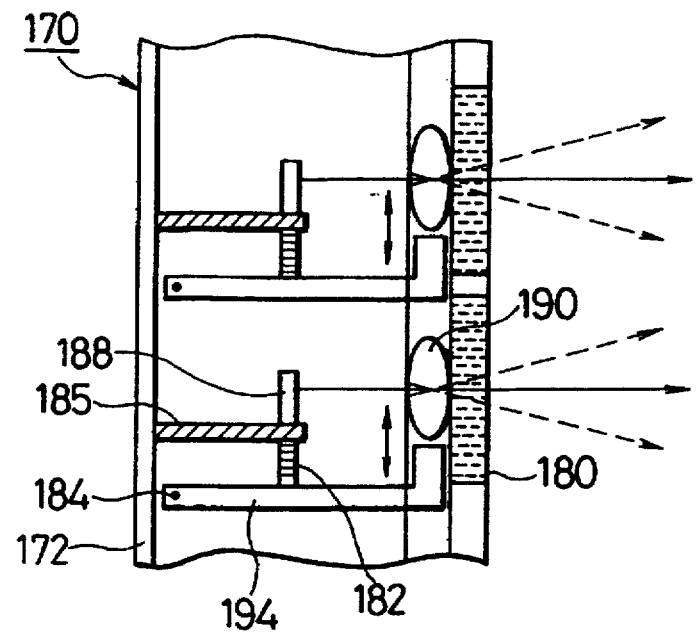
FIG. 50 is an explanatory diagram of a structure of a display to deflect a beam by driving a lens.

An embodiment of FIG. 50 is characterized in that the light emitting device 188 is attached to the supporting member 185 and a lever 194 having the fulcrum 184 is driven by the piezoelectric device 182 and the lens 190 is moved, thereby deflecting the light from the light emitting device 188.

Figure 51:
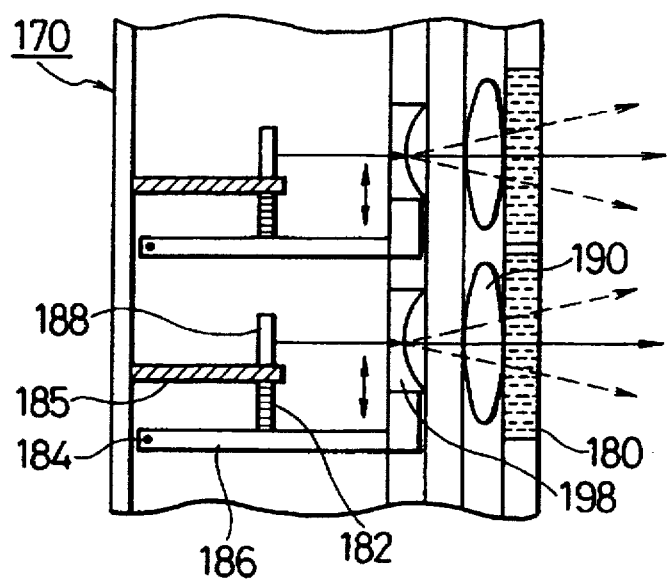
FIG. 51 is an explanatory diagram of a structure of a display to deflect a beam by driving one of two lenses.

Further, in an embodiment of FIG. 51, a lens 198 to enlarge a deflecting angle is provided in addition to the lens 190 and the lens 198 on the light emitting device 188 side is finely moved by the driving of the lever 186 by the piezoelectric device 182, thereby performing the deflecting operation.

In each of the embodiments of FIGS. 49 to 51, the deflection has been independently performed for one pixel. However, since no problem will occur even if the deflection for each pixel is simultaneously executed, it will be obviously understood that the lights from a plurality of pixels can be also deflected by using the same driving means as necessary.

Figure 52:
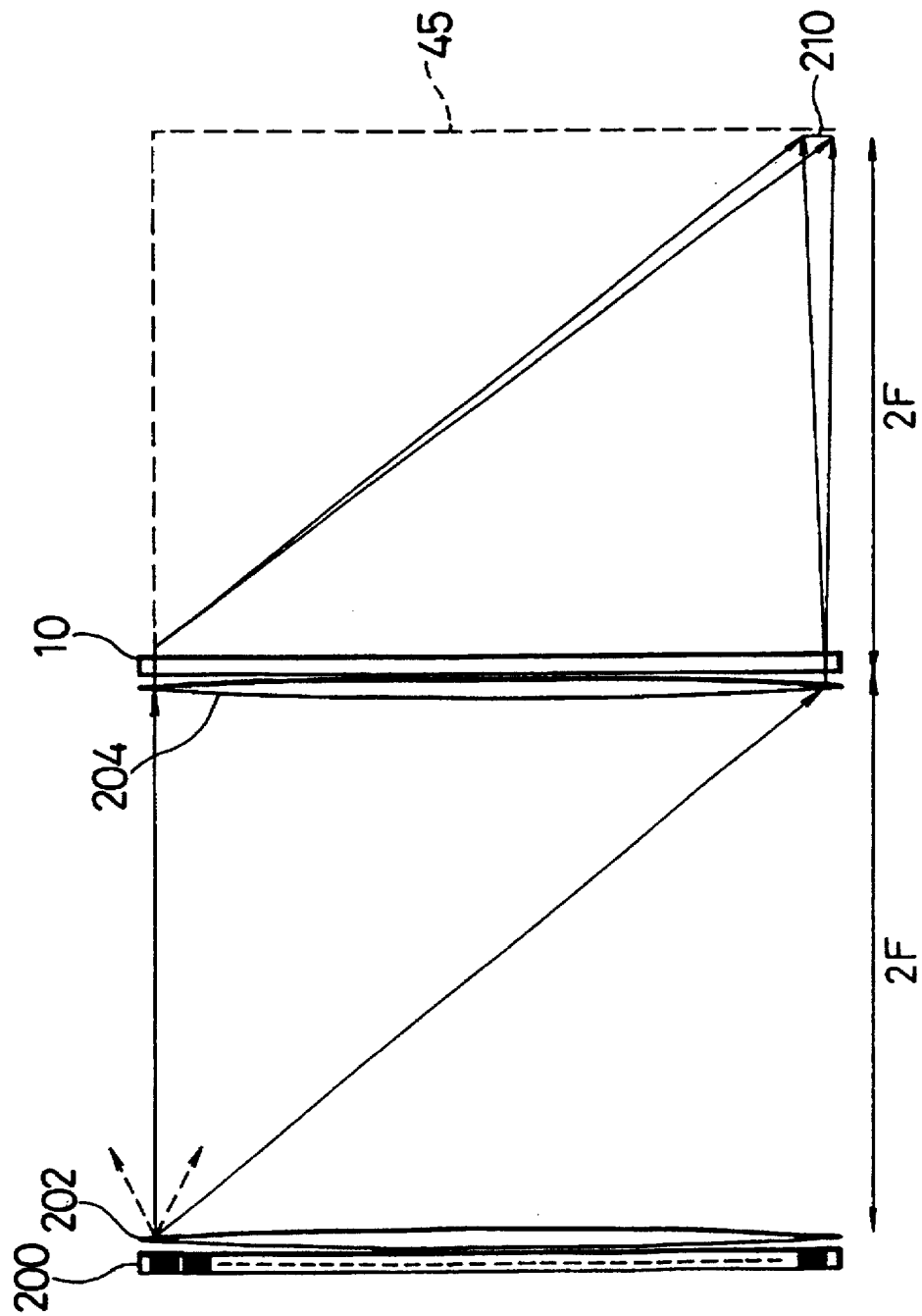
FIG. 52 is an explanatory diagram of a display structure to control the deflecting direction by a difference of the light emitting position.

FIG. 52 shows an embodiment in which the deflecting direction is controlled on the basis of a difference of the light emitting positions and the virtual opening position at which a 2-dimensional image can be observed is controlled. That is, FIG. 52 shows a plan view. An LED array 200 is used as means for controlling the deflecting direction due to a difference of the light emitting positions. The LED array 200 has a line-shape which is long in the vertical direction and each LED is densely arranged in the horizontal direction. Therefore, in the LED array 200, the light emitting point moves in the horizontal direction with the elapse of time. A Fresnel lens 202 of a focal distance of 2F is arranged in close vicinity to the LED array 200. A Fresnel lens 204 having a focal distance F is arranged at a position of the focal distance of 2F from the Fresnel lens 202. The 2-dimensional image display 10 is arranged in close vicinity to the Fresnel lens 204. Although the light emitted from, for example, the right edge of the LED array 200 is diffused as shown by arrows of broken lines, the light is effectively irradiated to the 2-dimensional image display apparatus 10 by the Fresnel lens 202. The light irradiated to the Fresnel tens 204 passes through the 2-dimensional image display 10 and is formed as an image in the region of a corresponding virtual opening 210 in the visible range 45. Since the light emitting position of the LED array 200 has a certain region as a light source, the image forming position in the visible range 45 also has a certain region and such a region functions as a virtual opening 210. A 2-dimensional image can be seen at this position.

Figure 53:
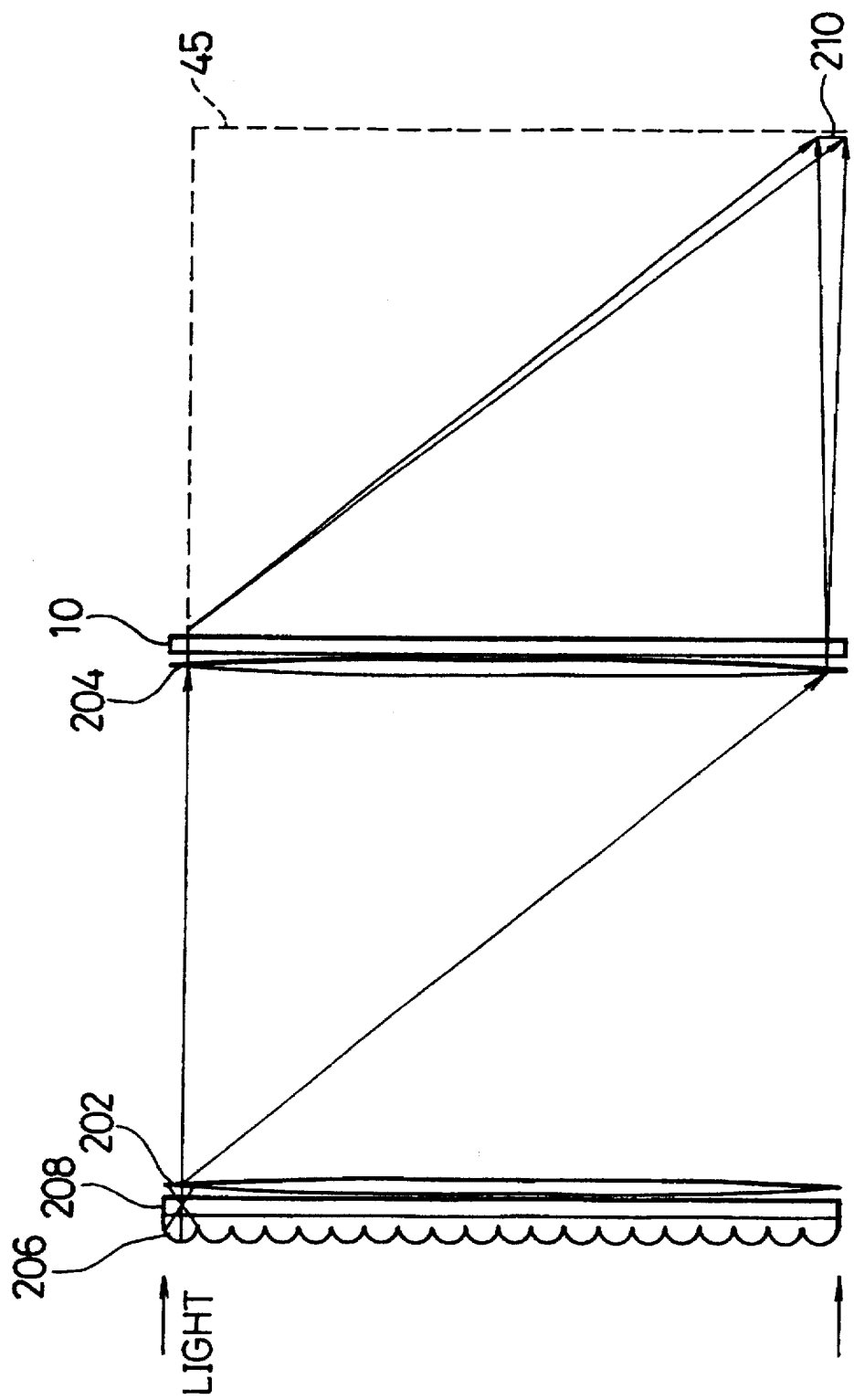
FIG. 53 is an explanatory diagram of a display structure to change the light emitting position due to a liquid crystal shutter.

An embodiment of FIG. 53 is characterized in that a Lenticular lens 206 and a liquid crystal shutter 208 are provided in place of the LED array 200 in FIG. 52. Namely, the light from the light source is converged by the Lenticular lens 206 and is inputted to the liquid crystal shutter 208. A slit-like opening which is narrow in the horizontal direction and is long in the vertical direction is formed by the liquid crystal shutter 208. This opening is moved in the horizontal direction with the elapse of time.

Figure 54:
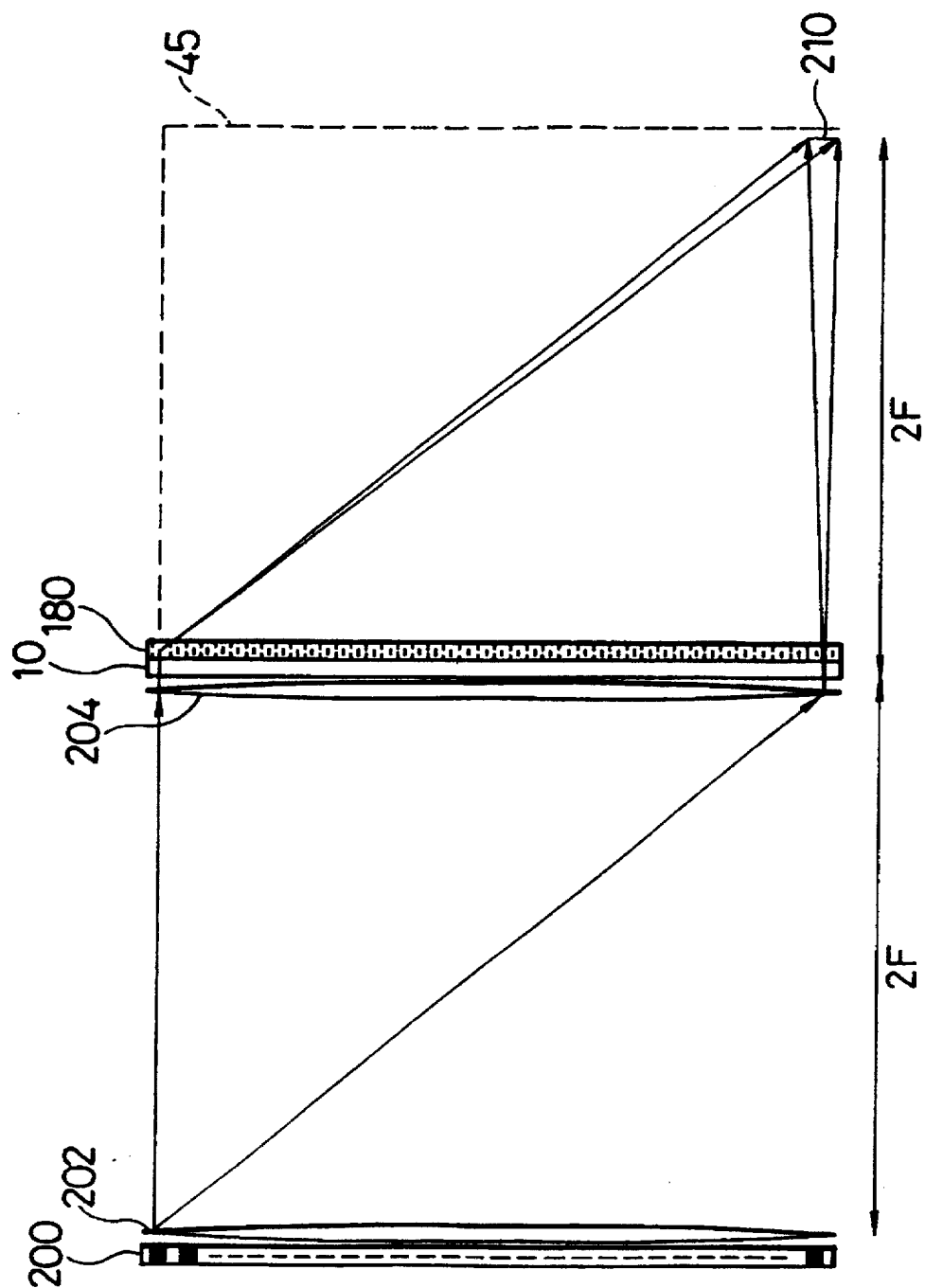
FIG. 54 is an explanatory diagram of a display structure in which a directional diffusing functional device is further added to FIG. 52.

FIG. 54 is characterized in that the directional radiating functional device 180 is further provided subsequent to the 2-dimensional image display 10 in the embodiment of FIG. 52, thereby preventing that the virtual opening 210 is limited by the size of light source.

Figure 55:
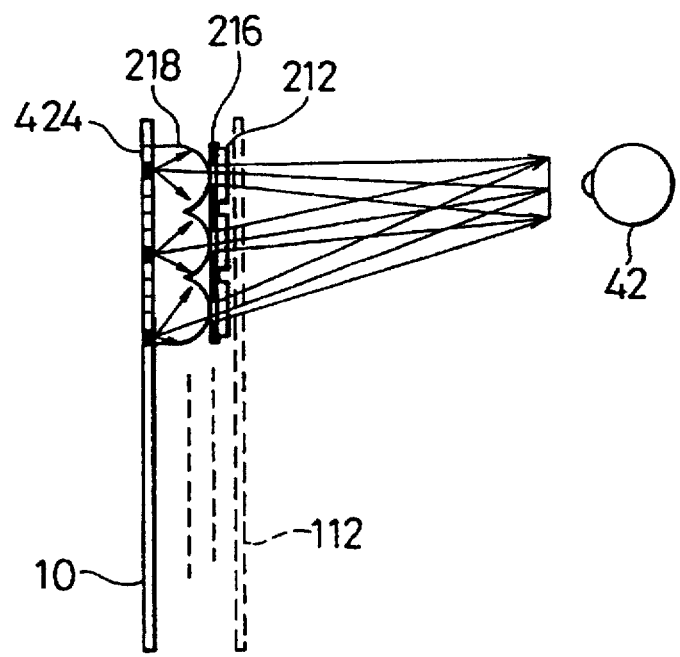
FIG. 55 is an explanatory diagram of a display apparatus in which an image display and a deflector are integrated.

Further, although the deflection and the display of the 2-dimensional image have been realized by different devices in each of the embodiments of FIGS. 46 to 54, the deflection and the display of the 2-dimensional image can be also performed by the same device as shown in FIG. 55. In an embodiment of FIG. 55, a Lenticular lens 218 is provided as a deflector in correspondence to a pixel 424 of the 2-dimensional image display 10. A plurality of display pixels 424 of the 2-dimensional image display 10 are made to correspond to one Lenticular lens and those pixels are arranged at the focal point positions of the Lenticular lens 218. By emitting the light by using a special one of a plurality of pixels corresponding to the Lenticular lens 218 as a picture element, the direction of the light is determined by the position of the pixel as a picture element and the deflecting direction can be controlled. Further, a mask 216 is provided subsequent to the Lenticular lens 218. A crosstalk from the adjacent pixel is eliminated by the mask 216. Further, the Lenticular lens 112 can be also provided as necessary.

Figure 56:
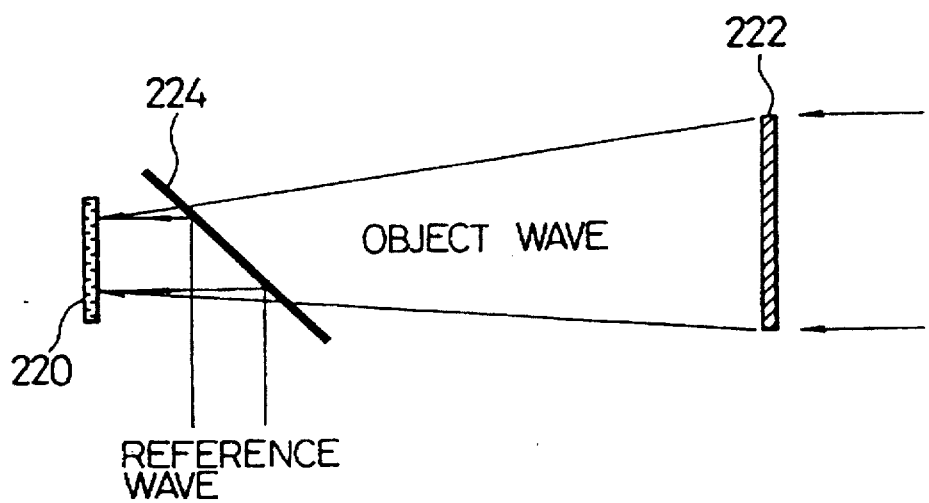
FIG. 56 is an explanatory diagram showing the formation of a hologram which is used as a directional diffusing functional device according to the fourth embodiment.
Figure 57:
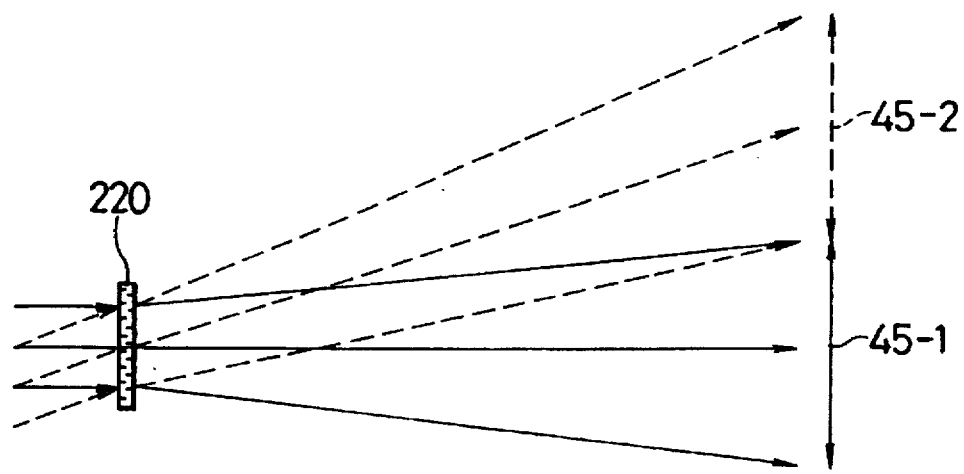
FIG. 57 is an explanatory diagram of a deflecting function by the hologram formed in FIG. 56.

FIG. 56 shows the formation of a hologram in the case where a hologram having a fixed interference fringe was used as a directional radiating functional device in the fourth embodiment. FIG. 57 shows a reconstructing state. In FIG. 56, the light from a diffusing plate 222 is transmitted as an object wave through a half mirror 224. The reference light is inputted from the perpendicular direction into the half mirror 224 and is reflected and a hologram 220 is formed by an interference exposure by the object wave and the reference wave. By inputting the light from the pixel of the 2-dimensional image to the hologram 220 formed as mentioned above as shown in FIG. 57, a deflecting state in which the setting position of the diffusing plate 222 upon formation is set to visible range 45-1 can be obtained. In this case, by inputting the reproduction light whose angle was changed and which is shown by broken lines into the hologram 220, a visible range 45-2 different from the visible range 45-1 can be set as shown by a broken line.

Figure 58:
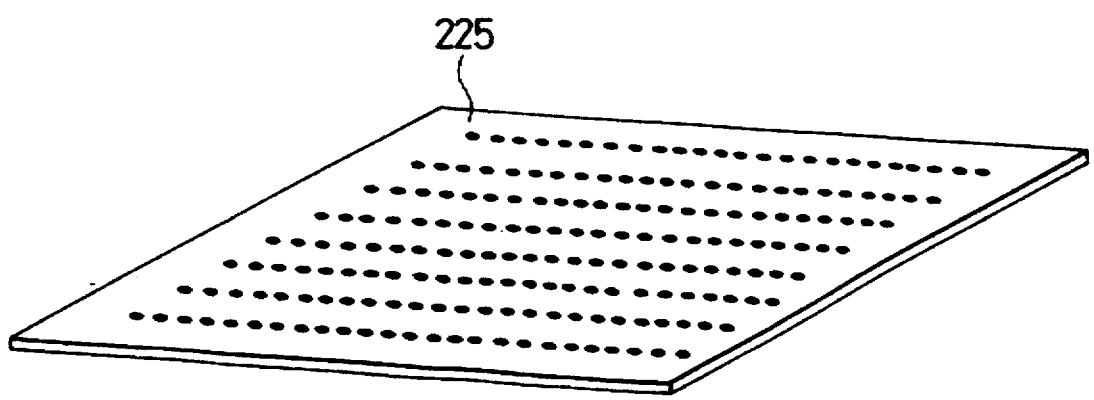
FIG. 58 is an explanatory diagram of an LD array which is used as a 2-dimensional image display in the first to fourth embodiments of the invention.

Although the liquid crystal display has been used as a 2-dimensional image display in the first to fourth embodiments, an LD array 225 in which laser diodes are two-dimensionally arranged can be also used as shown in FIG. 58. In case of using the LD array 225 as a 2-dimensional image display 10, one laser diode (LD) corresponds to one of the pixels of the 2-dimensional image in the first to third embodiments. A plurality of laser diodes correspond to one of the pixels of the 2-dimensional image in the fourth embodiment.

VIII. Fifth embodiment of a color steroscopic display

Figure 59:
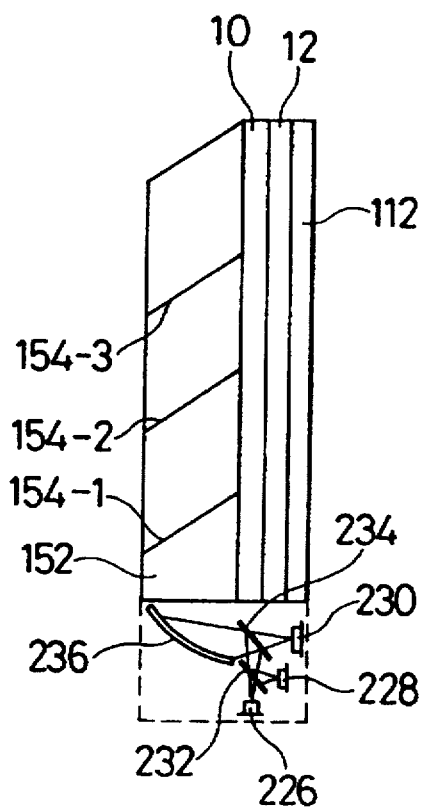
FIG. 59 is an explanatory diagram of an embodiment to display a color image by the time-divisional display of color components.

FIG. 59 shows an embodiment of a stereoscopic display apparatus of the invention which can display a color image and relates to a color display by the time-division as an example. The 2-dimensional image display section 10, phase distribution display section 12, and Lenticular lens 112 are the same as those in the second embodiment. A light source is provided every color component of R, G and B. Namely, semiconductor lasers are provided as a light source 226 for a red light (R), a light source 228 for a green light (G), and a light source 230 for a blue light (B). The color components of R, G, and B from the light sources 226, 228, and 230 are reflected by dichroic mirrors 232 and 234 and enter an aspheric mirror 236 and are converted into the parallel lights. The parallel lights are reflected by the same half mirrors 154-1 to 154-3 and mirror 156 as those shown in FIG. 42 and are irradiated to the 2-dimensional image display section 10.

Figure 60:
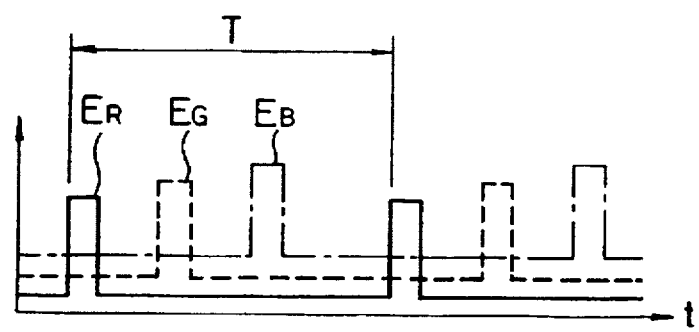
FIG. 60 is a timing chart showing a driving signal in FIG. 59.

FIG. 60 shows a driving timing by the time-division of the RGB images for the light sources of RGB in FIG. 59 and the 2-dimensional image display section 10. By repetitively generating timing signals $E_R$, $E_G$, and $E_B$ at a period of time of T=1/30 second, a color solid image by the time-division can be displayed.

Figure 61:
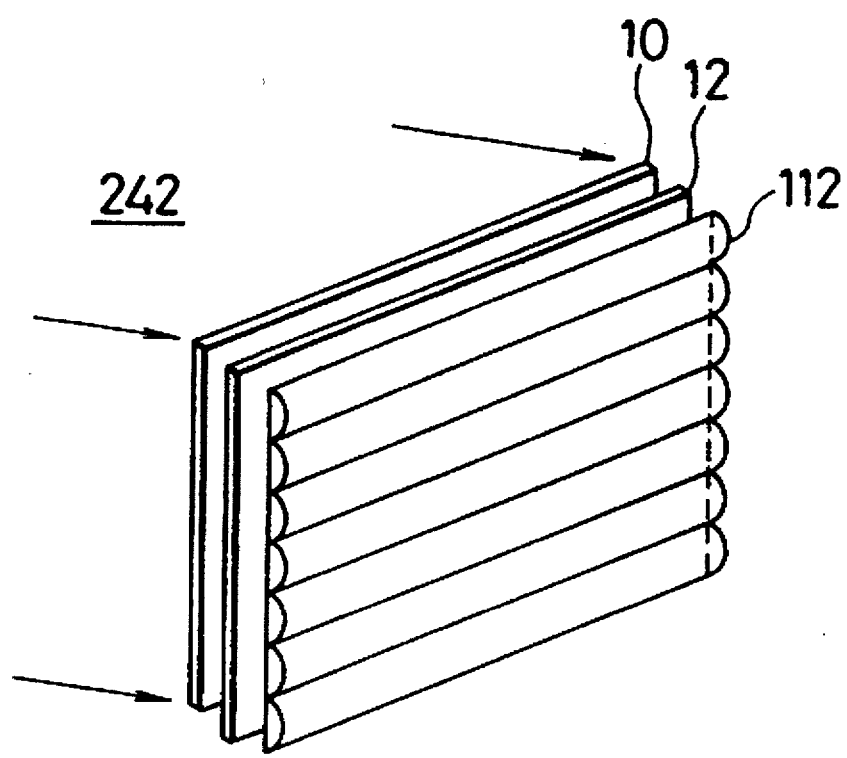
FIG. 61 is an explanatory diagram of a display apparatus to display a color image by the space-divisional display of color components.

FIG. 61 shows an embodiment of a stereoscopic display apparatus for displaying a color solid image by the space-division. The apparatus comprises the 2-dimensional image display section 10, phase distribution display section 12, and Lenticular lens 112 and uses a white light 242 as a light source for the display section 10.

FIGS. 62A and 62B show pixel constructions of the 2-dimensional image display section 10 and phase distribution display section 12 which are used for displaying a color solid image by the space-division in FIG. 61. First, FIG. 62A shows the 2-dimensional image display section 10. A filter 244 for R, a filter 246 for G, and a filter 248 for B are provided for the pixels. The RGB filters are repetitively arranged in the horizontal and vertical directions. FIG. 62B shows a cell arrangement of the phase distribution display 12. A cell 250 for R, a cell 252 for G, and a cell 254 for B are arranged in one-to-one correspondence to each filter of RGB in the 2-dimensional image display section 10 in FIG. 62A.

FIG. 63 shows a time chart of a driving signal in the stereoscopic color image display by the space-division shown in FIGS. 61, 62A, and 62B. It is sufficient to repetitively simultaneously display three components of R, G, and B at a period of time of T=1/30 second.

Figure 64A:
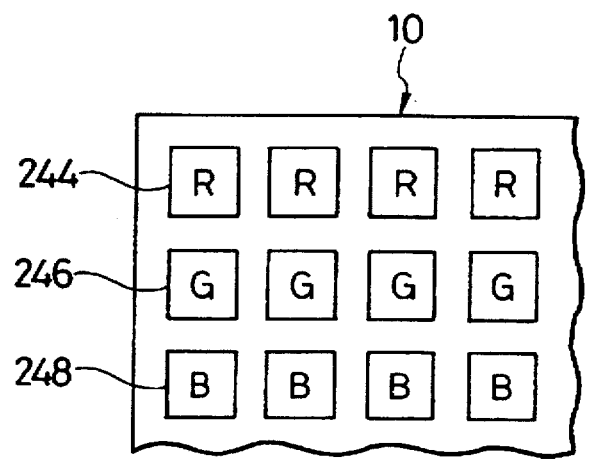
FIGS. 64A and 64B are explanatory diagrams showing an arrangement of display color filters in FIG. 61 and an arrangement of phase distributions for RGB in the case where a 2-dimensional image has a parallax in the horizontal direction.
Figure 64B:
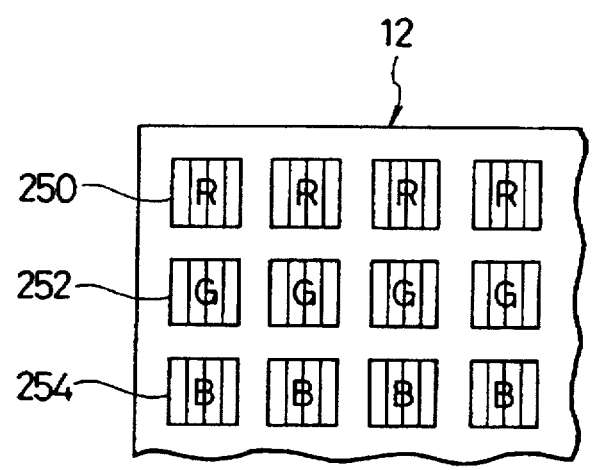

FIG. 64A shows an arrangement of the filters 244, 246, and 248 for RGB by the color solid image display by the space division in case of using a phase distribution display for deflecting the light in only the horizontal direction. FIG. 64B shows an arrangement of the cells 250, 252, and 254 for R, G, and B in the phase distribution display 12 corresponding to FIG. 64A. By spatially repetitively arranging the filters for R, G, and B in the vertical direction, a color solid image can be displayed.

The RGB filters of the pixels provided in the 2-dimensional image display section 10 shown in FIGS. 62A, 62B, 64A, and 64B receive the irradiation of the white light or the light including bright line spectra of R, G, and B and extract the RGB components and emits the lights of the intensities according to the control intensities of the liquid crystal pixels.

According to the invention as mentioned above, in an image type holographic stereogram, there is no need to perform the phase calculation with respect to each of the 2-dimensional images of different visual directions. By time-divisionally displaying the 2-dimensional images of different visual directions, a solid image can be allowed to be recognized as an after-image. Therefore, since there is no need to perform the calculation of the phase distribution upon reconstruction display, the construction of the apparatus can be simplified. The invention can cope with the high-speed display in a moving image display or the like. The calculation load on the computer can be obviously remarkably reduced.

The present invention is not limited to the above embodiments but many variations and modifications are possible. The invention is also not limited by the numerical values shown in the embodiments.

What is claimed is:

1. A stereoscopic display apparatus comprising:
   image display means for displaying a plurality of 2-dimensional images of different visual directions; and
   beam deflecting means for deflecting lights from the pixels constructing an image of said image display means.

2. An apparatus according to claim 1, wherein said beam deflecting means is independently provided for each pixel constructing the image.

3. An apparatus according to claim 1, wherein said beam deflecting means is provided for a plurality of pixels constructing the image.

4. A steroscopic display apparatus comprising:
   image display means for displaying a plurality of two-dimensional images of different visual directions; and
   beam deflecting means for deflecting light from pixels constructing an image of said image display means,
   wherein said beam deflecting means is independently provided for each pixel constructing the image, and
   wherein said beam deflecting means includes
      deflection scanning means for deflecting and scanning light from each pixel; and
      directional diffusing means for diffusing the light deflected by said deflection scanning means within a predetermined angle range and transmitting.

5. An apparatus according to claim 3, wherein said beam deflecting means is constructed by phase display means for displaying the phase distribution by diffusing the light from each pixel within a predetermined angle range and diffracting.

6. An apparatus according to claim 3, wherein said beam deflecting means has:
   deflection scanning means for deflecting and scanning the light from each pixel; and
   directional diffusing means for diffusing the light deflected by said deflection scanning means within the predetermined angle range and transmitting.

7. An apparatus according to claim 2, wherein said beam deflecting means includes phase distribution display means constructed by means for displaying a phase distribution in only the horizontal direction and light enlarging means in the vertical direction.

8. An apparatus according to claim 1, wherein said image display means is means for displaying a 1-dimensional image in the horizontal direction, and said apparatus further includes phase distribution display means serving as a means for displaying a phase distribution in only the horizontal direction, and scanning means in the vertical direction, image forming means, and light enlarging means in the vertical direction.

9. An apparatus according to claim 8, wherein said image display means and said phase distribution display means are realized by pixels for image display and pixels for phase display, each of said pixels for phase display is a pixel which is short in the horizontal direction and long in the vertical direction.

10. An apparatus according to claim 5, wherein said image display means sequentially displays a plurality of images produced from the images in the plurality of visual directions, and said phase distribution display means diffracts the light from the pixel constructing each image toward a plurality of virtual openings.

11. An apparatus according to claim 10, wherein said phase distribution display means comprises: means for displaying the phase distribution in only the horizontal direction; and light diffusing means in the vertical direction.

12. An apparatus according to claim 10, wherein said image display means is means for displaying the image only in the horizontal direction, said phase distribution display means is means for displaying a phase distribution in only the horizontal direction, and said apparatus further has scanning means in the vertical direction, image forming means, and light diffusing means in the vertical direction.

13. An apparatus according to claim 11, wherein said means for displaying the phase distribution in only the horizontal direction is an acoustic optical device array.

14. An apparatus according to claim 4, wherein said image display means displays the image from a desired direction, and said beam deflecting means deflects the light from the pixel constructing the image toward a virtual opening which is determined by the visual direction of the light from the pixel constructing the image.

15. An apparatus according to claim 4, wherein said image display means displays images formed from the image in a plurality of visual positions, and said beam deflecting means deflects the lights from the pixels constructing said image toward a plurality of virtual openings.

16. An apparatus according to claim 4, wherein said beam deflecting means is constructed by means for performing the deflection in the horizontal and vertical directions.

17. An apparatus according to claim 4, wherein said beam deflecting means is constructed by means for deflecting in only the horizontal direction, and optical enlarging means in the vertical direction which is provided as necessary.

18. An apparatus according to claim 4, wherein said image display means is means for displaying the image in only the horizontal direction, said beam deflecting means is means for deflecting in only the horizontal direction, and said apparatus further has scanning means in the vertical direction, image forming means, and light diffusing means in the vertical direction.

19. An apparatus according to claim 4, wherein said deflecting means is constructed by an auxiliary optical system having an image forming function and means for changing a relative position of the pixel for image display.

20. An apparatus according to claim 19, wherein a piezoelectric device is used as means for changing the relative position.

21. An apparatus according to claim 4, wherein said deflecting means comprises a light source group which are spatially separated and a device having an image forming function, a distance between the light source group which were spatially separated and the device having said image forming function is equal to or larger than a focal distance of the device, and said deflecting means is constructed by the light emitting position of the light source group which were spatially separated.

22. An apparatus according to claim 21, wherein the light source constructing said light source group doesn't have the directional diffusing function but emits a wave front having a diffusing property which is extended at a predetermined angle.

23. An apparatus according to claim 21, wherein the light source group which were spatially separated are constructed by a liquid crystal shutter for allowing an incident plane wave to pass through a slit region.

24. An apparatus according to claim 21, wherein said light source group which were spatially separated is constructed by a light emitting device array.

25. An apparatus according to claim 15 wherein a plurality of picture elements are made correspond to one pixel to display the image of said image display means, and the means for deflecting the light in the horizontal direction is constructed by a Lenticular lens and a plurality of light emitting devices arranged at a focal point position of the Lenticular lens.

26. An apparatus according to claim 25, wherein the means for deflecting the light in the horizontal direction changes the light emitting intensities and positions of said plurality of light emitting device groups, thereby deflecting.

27. An apparatus according to claim 1, wherein said image display means is constructed by means for making one light emitting device correspond to the pixel of the image and for changing a light emitting intensity of the light emitting device.

28. An apparatus according to claim 27, wherein said light emitting device is a laser diode.

29. An apparatus according to claim 17, wherein said means for deflecting in only the horizontal direction is constructed by a mirror in which the direction of the surface is periodically changes.

30. An apparatus according to claim 4, wherein said directional diffusing means is realized by a diffusing plate.

31. An apparatus according to claim 4, wherein said directional diffusing means is realized by a hologram plate.

32. An apparatus according to claim 31, wherein said hologram plate is disposed at a position at which the light from the diffusing plate of a limited region has been recorded.

33. An apparatus according to claim 17, wherein said vertical direction scanning means is realized by a galvano mirror.

34. An apparatus according to claim 17, wherein said vertical direction light enlarging means is realized by a Lenticular lens.

35. An apparatus according to claim 1, wherein said plurality of 2-dimensional image groups of different visual directions are a 2-dimensional image group of a plurality of color components, said beam deflecting means performs the deflection for each color component, said image display means displays the image of every color component, and the image and deflection of every color component are changed with the elapse of time by using a same device irrespective of the color component, thereby displaying a color image.

36. An apparatus according to claim 1, wherein said plurality of 2-dimensional image groups of different visual directions are 2-dimensional images of a plurality of color components, said image display means has means for spatially separating the pixels of a plurality of color components and displaying, and said beam deflecting means displays a color image by means for simultaneously performing the diffraction to the color components.

37. An apparatus according to claim 22, wherein the light source group which are spatially separated are constructed by a liquid crystal shutter for allowing an incident wave to pass through a slit region.

38. An apparatus according to claim 22, wherein said light source group which were spatially separated is constructed by a light emitting device array.

39. An apparatus according to claim 18, wherein said vertical direction light enlarging means is realized by a galvano mirror.

40. An apparatus according to claim 18, wherein said vertical direction light enlarging means is realized by a lenticular lens.

* * * * *